United States Patent
Fu et al.

(10) Patent No.: US 10,033,833 B2
(45) Date of Patent: Jul. 24, 2018

(54) APPARATUS, SYSTEMS AND METHODS FOR AUTOMATIC DISTRIBUTED APPLICATION DEPLOYMENT IN HETEROGENEOUS ENVIRONMENTS

(71) Applicant: Cisco Technology, Inc., San Jose, CA (US)

(72) Inventors: Tianying Fu, San Jose, CA (US); Saad Ali Malik, Milpitas, CA (US); Gautam Joshi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 223 days.

(21) Appl. No.: 14/993,018

(22) Filed: Jan. 11, 2016

(65) Prior Publication Data

US 2017/0201569 A1   Jul. 13, 2017

(51) Int. Cl.
| | |
|---|---|
| G06F 15/173 | (2006.01) |
| H04L 29/08 | (2006.01) |
| G06F 8/60 | (2018.01) |
| G06F 9/455 | (2018.01) |
| H04L 12/24 | (2006.01) |

(52) U.S. Cl.
CPC .............. *H04L 67/34* (2013.01); *G06F 8/60* (2013.01); *G06F 9/455* (2013.01); *G06F 9/45558* (2013.01); *H04L 41/08* (2013.01)

(58) Field of Classification Search
CPC .......... G06F 9/455; H04L 67/10; H04L 41/08
USPC ................................. 709/203, 206
See application file for complete search history.

(56) References Cited

U.S. PATENT DOCUMENTS

| | | | |
|---|---|---|---|
| 8,739,157 B2 † | 5/2014 | Ho | |
| 8,812,627 B2 * | 8/2014 | Donahue | G06F 9/5072 709/220 |
| 9,319,286 B2 * | 4/2016 | Panuganty | H04L 41/0893 |
| 2013/0263209 A1 * | 10/2013 | Panuganty | H04L 43/04 726/1 |
| 2014/0026122 A1 * | 1/2014 | Markande | G06F 11/3664 717/124 |

(Continued)

OTHER PUBLICATIONS

Wang, Allen and Tonse, Sudhir. Jun. 18, 2012. "Announcing Archaius—Dynamic Properties in the Cloud."†

(Continued)

*Primary Examiner* — Phuoc Nguyen
(74) *Attorney, Agent, or Firm* — Ronald Fernando

(57) ABSTRACT

Embodiments disclosed facilitate distributed orchestration and deployment of a cloud based distributed computing application. In some embodiments, a first deployment context associated with a cloud based application may be determined. The first deployment context may comprise a plurality of rules, where each rule may specify conditions for applying configurations to resources associated with the cloud based application. The conditions specified by the plurality of rules may be evaluated and configurations of the resources associated with the cloud based application may be determined. In some embodiments, the deployment of the cloud based application on a first cloud may then be orchestrated based, in part, on the first deployment context, by configuring the resources associated with the cloud based application based on the previously determined configurations of the resources.

27 Claims, 12 Drawing Sheets

(56) References Cited

U.S. PATENT DOCUMENTS

| | | | | |
|---|---|---|---|---|
| 2014/0278623 A1* | 9/2014 | Martinez | ............... | G06Q 10/06 705/7.12 |
| 2014/0372533 A1* | 12/2014 | Fu | ........................ | H04L 67/10 709/204 |
| 2015/0074278 A1* | 3/2015 | Maes | .................... | H04L 47/70 709/226 |
| 2016/0019636 A1* | 1/2016 | Adapalli | ............ | G06Q 30/0641 705/26.62 |

OTHER PUBLICATIONS

Maji, A.K., Mitra, S., Zhou, B., Bagchi, S. and Verma, A., Dec. 2014. Mitigating interference in cloud services by middleware reconfiguration. In Proceedings of the 15th International Middleware Conference (pp. 277-288). ACM.†

\* cited by examiner
† cited by third party

APPARATUS, SYSTEMS AND METHODS FOR AUTOMATIC DISTRIBUTED APPLICATION DEPLOYMENT IN HETEROGENEOUS ENVIRONMENTS

BACKGROUND

Technical Field

The present invention relates to the field of distributed computing and in particular, to apparatus, systems, and methods to facilitate deployment of cloud based applications across heterogeneous cloud computing infrastructures.

Description of Related Art

The performance of computing applications may often be increased by distributing the computational workload across a networked cluster of computers. A physical networked cluster of computers with attendant software facilitating virtualization is often referred to as a "cloud" or "cloud infrastructure" or simply an infrastructure. Clouds may thus be viewed as tangible physical hardware that are encapsulated with layers of software to facilitate the viewing of the underlying hardware as computational units. Cloud computing facilitates on-demand access to resources, which may be rapidly scaled up or down in proportion to user requirements.

Clouds may be public and/or private. For example, publicly available clouds or "public clouds", may be accessed programmatically (e.g. using Application Programming Interfaces (APIs)) over the Internet and may be made available as virtual machines (VMs) on a pay-per-use basis by third parties to customers. On the other hand, organizations may have private clouds for use by employees or customers within an enterprise's data center and/or may use a hybrid cloud, which may be a combination of public-private clouds to deploy and run applications.

When a cloud based application is deployed on a cloud, resources for the application may be provisioned, and one more services that components of the application depend upon may be started in some specified order in a process termed orchestration. Cloud orchestration refers to processes to automate (at least partially) a variety of tasks related to managing and coordinating resource deployment on a cloud.

Conventional techniques for cloud orchestration may give rise to inefficiencies, may create bottlenecks, and may also decrease fault tolerance. For example, even when one or more portions of the orchestration can be automated, many deployment choices are made manually. As one example, manual intervention in orchestration may be related to conditions, policies, or deployment scenarios that are related to the context of deployment and not directly related to the cloud based application being deployed.

As one example, a cloud based application may be deployed for development and/or testing purposes (e.g. after an update, before production deployment, to test bug fixes etc). For such development and/or testing purposes, a user may want to limit costs and prefer to deploy the application to a first cloud (e.g. a public cloud), place all application services into one VM, log one or more events related to application debugging, and automatically shut down the cloud based application within some specified time period. In contrast, at production time, the user may prefer to deploy the same application to a second cloud (e.g. a highly secure private cloud) with a service-level guarantee, distribute services associated with the cloud based application across Virtual Machines (VMs) in the second cloud, allow scaling of one or more tiers of the cloud based application, and/or log events for performance monitoring. In conventional orchestration schemes, in the example above, users may need to: make several manual choices at deployment time to orchestrate the deployment of the application. The orchestration difficulties above may be compounded because conventional cloud based applications are typically cloud-specific—i.e. each implementation of the cloud based application is for a specific cloud. Therefore, in addition to differences in orchestration from one cloud to another and differences in the context in which deployment occurs, users may also need to account for differences in implementation of the cloud based application for each cloud, thereby compounding the complexity, cost, and inefficiencies associated with cloud based application deployment, while limiting flexibility.

As a consequence of the difficulties outlined above, which arise from problems rooted in cloud computing technology and cloud based application deployment on cloud computing infrastructures, apparatus, methods and techniques to provide improvements to cloud computing technology and cloud based application deployment on cloud computing infrastructures are desired.

SUMMARY

Consistent with embodiments disclosed herein, various exemplary apparatus, systems and methods for facilitating the orchestration and deployment of cloud based applications on cloud computing infrastructures are described.

In some embodiments, a processor-implemented method may comprise: determining a first deployment context associated with a cloud based application, the first deployment context comprising a plurality of rules, wherein each rule in the plurality of rules specifies at least one corresponding condition, wherein the plurality of rules determine configurations to be applied to one or more resources associated with the cloud based application; evaluating conditions specified by the plurality of rules associated with the first deployment context; determining, based on the evaluation of the conditions, configurations of the one or more resources; and orchestrating deployment of the cloud based application on a first cloud based, in part, on the first deployment context, by configuring each of the one or more resources associated with the cloud based application based on the determined configurations of the one or more resources.

In another embodiment, an apparatus may comprise: a memory, and at least one processor coupled to the memory, wherein the processor may be configured to: determine a first deployment context associated with a cloud based application, the first deployment context comprising a plurality of rules, wherein each rule in the plurality of rules specifies at least one corresponding condition, wherein the plurality of rules determine configurations to be applied to one or more resources associated with the cloud based application; evaluate conditions specified by the plurality of rules associated with the first deployment context; determine, based on the evaluation of the conditions, configurations of the one or more resources; and orchestrate deployment of the cloud based application on a first cloud based, in part, on the first deployment context, by configuring each of the one or more resources associated with the cloud based application based on the determined configurations of the one or more resources.

In a further embodiment, a non-transitory computer-readable medium may comprise instructions, which, when executed by a processor, perform steps in a method comprising: determining a first deployment context associated with a cloud based application, the first deployment context comprising a plurality of rules, wherein each rule in the plurality of rules specifies at least one corresponding condition, wherein the plurality of rules determine configurations to be applied to one or more resources associated with the cloud based application; evaluating conditions specified by the plurality of rules associated with the first deployment context; determining, based on the evaluation of the conditions, configurations of the one or more resources; and orchestrating deployment of the cloud based application on a first cloud based, in part, on the first deployment context, by configuring each of the one or more resources associated with the cloud based application based on the determined configurations of the one or more resources.

Embodiments also relate to software, firmware, and program instructions created, stored, accessed, or modified by processors using computer-readable media or computer-readable memory. The methods described may be performed on processors, various types of computers, and computing systems—including distributed computing systems such as clouds. The methods disclosed may also be embodied on computer-readable media, including removable media and non-transitory computer readable media, such as, but not limited to optical, solid state, and/or magnetic media or variations thereof and may be read and executed by processors, computers and/or other devices.

These and other embodiments are further explained below with respect to the following figures.

DETAILED DESCRIPTION

In accordance with embodiments disclosed herein, apparatus, systems and methods to facilitate distributed application orchestration and deployment of cloud based applications are presented.

In some embodiments disclosed herein a cloud agnostic representation of a single cloud based application may be seamlessly deployed to one or more clouds in a context sensitive manner in a heterogeneous computing environment that may include a plurality of distinct cloud types. In some embodiments, the orchestration and deployment of the cloud based application may occur automatically based on a prevailing deployment context without recoding, recompiling, and/or manual intervention during application deployment.

Figure 1:
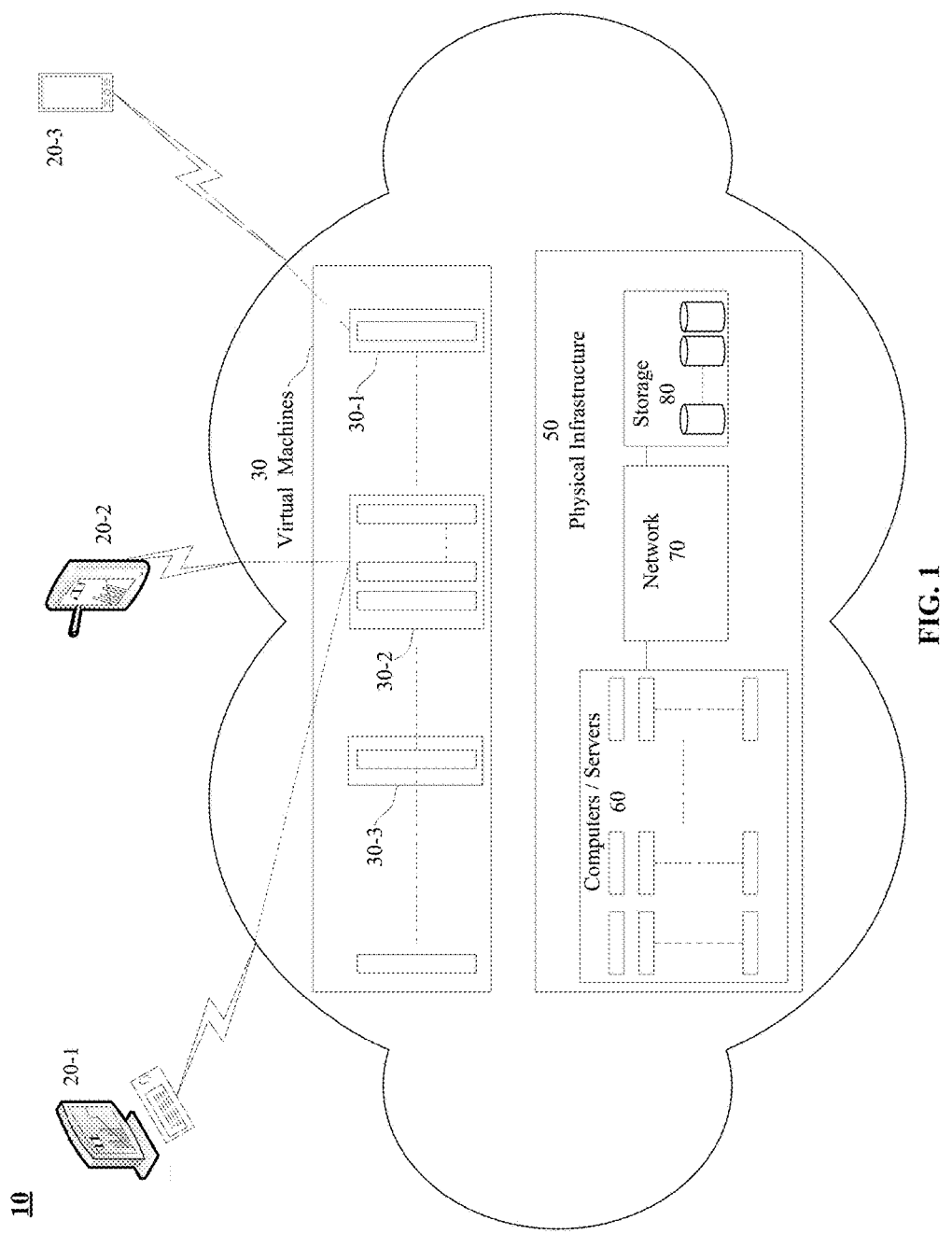
FIG. 1 shows an exemplary cloud infrastructure or cloud.

FIG. 1 shows an exemplary cloud infrastructure or cloud 10, which comprises underlying Physical Infrastructure 50 with computers/servers 60, which may be networked using a high speed network backbone such as network 70. Network 70 may also couple storage 80 to computers/servers 60. A physical networked cluster of computers with attendant software facilitating virtualization is often referred to as a "cloud" or "cloud infrastructure" or simply an infrastructure. The term "heterogeneous" as used herein in reference to "clouds" or "cloud infrastructures" refers to environments with several distinct cloud types. The cloud types may be different because they are provided by different service providers (Amazon AWS, Google, Rackspace, Microsoft Azure, VMware, OpenStack, etc), or whether the clouds are private, public or a hybrid public-private clouds.

The software layer facilitates the underlying physical hardware associated with clouds, which can include computers, servers, memory, storage, and network resources, to be viewed as virtualized units. These virtualized units represent some fraction of the underlying computing hardware or resources supported by the cloud infrastructure. Therefore, from a logical perspective, clouds may be viewed as a collection of VMs, such as Virtual Machines 30 shown in FIG. 1. Virtual Machines 30 may be instantiated by users to run cloud based applications. Typically, a cloud may provide a variety of VM types with different computing (CPU), memory, storage, networking, and Operating System (OS) options.

Clouds, thus, provide access to computing infrastructure remotely, including compute, storage and network resources, so that the resources can be reserved, provisioned, accessed and released programmatically. For example, programmatic interfaces such as Application Programming Interfaces (APIs), System Development Kits (SDKs), Web Services, etc. may be used to access resources made available by clouds remotely over a wide-area network (WAN). For example computing devices 20 such as computer 20-1, tablet computer 20-2 or handheld or wearable device 20-2 may be used to run applications utilizing resources provided by cloud 10.

VMs 30 represent some underlying fraction of the Physical Infrastructure 50. VMs often provide a complete system platform, which may also support the execution of a complete operating system by the VM in addition to one or more applications. One method of deploying VMs on clouds may use images termed Virtual Machine Images (VMIs), which are typically filesystem images including an operating system, application servers and/or application(s) to be executed by the VM, data, and a cloud specific portion.

Cloud computing may be viewed broadly in terms of three models. In the Infrastructure-as-a-Service (IaaS) model, cloud providers supply the compute, network and storage mechanisms but cloud customers may run, manage, and configure their (e.g. operating system and applications) own VMs. In systems based on an IaaS model, the provider may typically manage the underlying physical cloud infrastructure. For example, the provider may manage Physical Infrastructure 50.

In the Platform-as-a-Service (PaaS) model, cloud providers supply a platform, which includes a preconfigured software stack, upon which customers may run applications. In systems based on a PaaS model, the PaaS provider may manage the platform (infrastructure and software stack), while the run-time execution environment may be managed by users. For example, in FIG. 1, the cloud infrastructure provider may manage Physical Infrastructure 50 and the configuration of VMs 30, while the user may manage or configure the applications being deployed on Cloud 10.

In the Software-as-a-Service (SaaS) model, the cloud provider may additionally provide ready to use software applications such as financial or business applications for customer use. In systems based on an SaaS model, the SaaS provider may manage the cloud infrastructure, any software stacks, and the ready to use applications. In the SaaS model, the user would merely configure pre-deployed applications on Cloud 10.

The IaaS, PaaS, and SaaS models above present a monolithic view of a cloud. However, in general, a cloud/cloud based applications may be implemented and/or configured so that a cloud based application may have portions that are based on an IaaS paradigm (e.g. a core user application), other components that SaaS based (e.g. agents for monitoring performance/collecting statistics), as well as PaaS components (e.g. end-point services such as database services).

A "cloud node" or "node" may be responsible for the control and operation of one or more VMs, and there may be several nodes per cloud. In some embodiments, one or more cloud nodes may be involved in orchestration, including the start up, monitoring, tear down and/or migrations of applications running on a cloud. Because of virtualization and depending on the resources allocated to a cloud node, the cloud node may take the form of a virtual server, which may be implemented, in part, by using one or more physical processors or some fraction thereof of the available processing power.

To deploy a cloud based application, resources (compute, storage, network, services etc) for the application may be provisioned, and one more services that components of the application depend upon may be started in some specified order in a process termed orchestration. For example, an initialization script may be launched after a VM is booted for the first time, which may specify a sequence of tasks (installing and/or configuring software, etc) to be performed. In general, cloud orchestration refers to the automation (or partial automation) of a variety of tasks related to managing, coordinating and deploying resources on a cloud. Upon completion of orchestration, the system may deliver some defined functionality. Thus, orchestration stitches together software and hardware components in the cloud to deliver the desired functionality. In some embodiments, workflows may be used to specify how the software and hardware components are brought up and stitched together to deliver the desired functionality.

Figure 2:
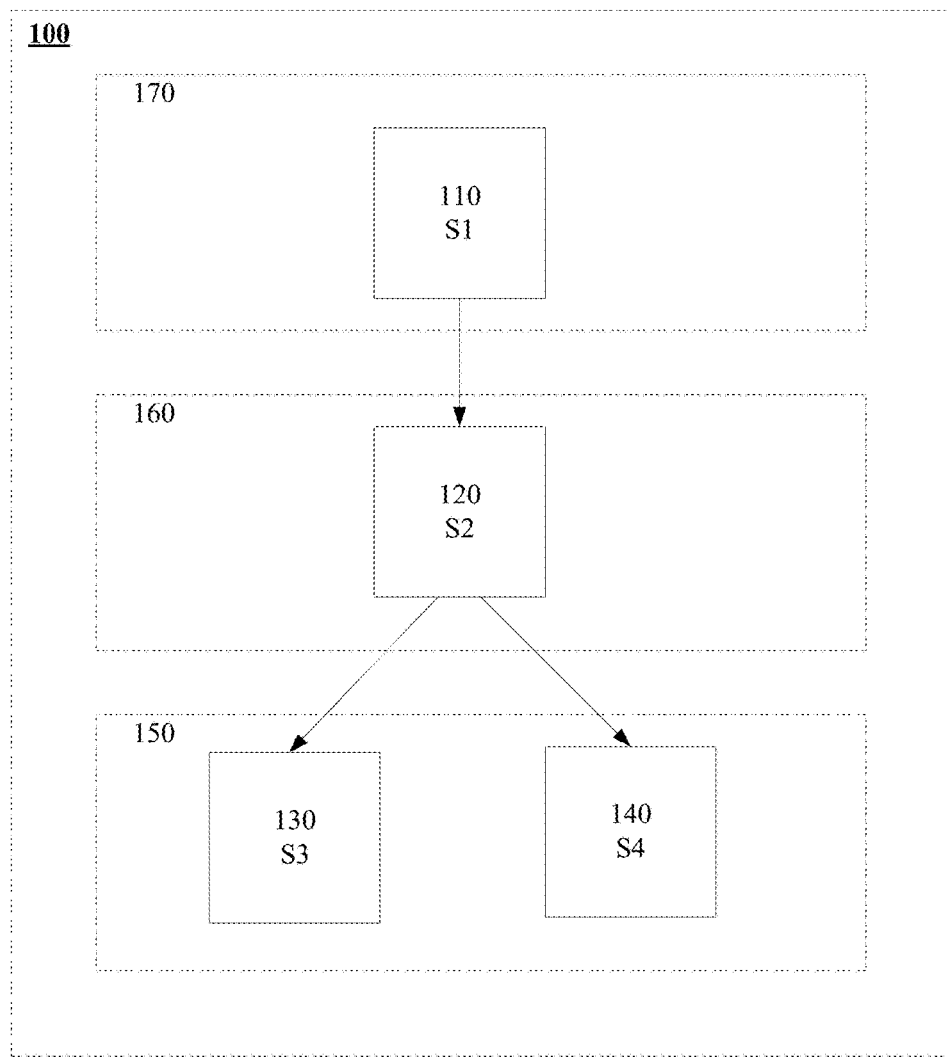
FIG. 2 shows an exemplary multi-tier cloud application illustrating an initialization sequence based on service dependencies.

In situations where the tasks involved in orchestration have dependencies and/or other constraints, orchestration may be time consuming and cumbersome. For example, a user may want to deploy a first cloud based application on VMs 30-2 at a point in time. Referring to FIG. 2, which shows a multi-tier application 100 comprising component S1 110, S2 120, S3 130 and S4 140, the user may, for example, want to distribute the components S3 130 and S4 140 on one VM in VMs 30-2, S2 120 on another VM in VM 30-2 and S1 110 on a third VM in VMs 30-2 during a first deployment scenario. At another time, the user may want to deploy the same multi-tier application 100 on VM 30-2, for example, for debugging or maintenance purposes, so that components S1 110, S2 120, S3 130 and S4 140, are placed on a single VM 30-3. In general, at deployment time, orchestration may vary based on deployment conditions prevailing at the time of deployment. The deployment conditions may include parameters such as cloud load, cloud pricing, or context in which the application is being deployed such as debugging, production, testing, customer evaluation etc. Because many of these conditions are not related to the application itself, but to extraneous factors outside the control of the cloud based application, manual intervention is often used to make choices at deployment time.

In the description below, the term "deployment context" is used to refer to conditions affecting deployment that are not related to core application functionality itself, but to extraneous factors not within the control of the cloud based application. In some embodiments, these extraneous factors may determine how resources used by the cloud based application are configured. For example, these extraneous factors may affect the performance of the cloud based application, the cost of running the cloud based application, and the deployment and execution environment of the cloud based application.

Moreover, in conventional schemes, for users who deploy or desire to deploy one or more applications on multiple clouds, the process of orchestrating application deployment can lead to additional inefficiencies. Because conventional orchestration actions are cloud specific, orchestration program code is rewritten and separately updated, maintained and debugged for each cloud on which an application executes, thereby resulting in effort duplication and higher costs. For example, features or services available on a first cloud may not be available on another second cloud or may be implemented differently on the second cloud. Therefore, in addition to manual intervention related to deployment context, conventional techniques that deploy cloud based application deployment across a plurality of clouds in heterogeneous environments with multiple cloud providers can also suffer from: higher maintenance costs, effort and code duplication, limited portability across clouds, and difficulties in streamlining orchestration across the clouds.

Disclosed embodiments facilitate automated context sensitive orchestration and deployment of distributed applications across a plurality of clouds in heterogeneous environments with multiple cloud providers. The distributed application may include multi-tier applications. Further, in some embodiments, the cloud based application deployment may be deployed in a context sensitive manner for a plurality of deployment contexts. For example, deployment context parameters may be used to specify one or more of the following scenarios: (1) the specific cloud(s) to deploy the application; and (2) for each cloud where the cloud based application is to be deployed: (a) the cloud account(s) to be used for application deployment; (b) the cloud-specific settings for the current deployment; (c) the auto-scaling (how/when should the application be scaled), auto-shutdown, and/or termination protection policies that apply to the deployment (d) the distribution of services across VMs (i.e. a mapping of services to VMs) and (e) configuration settings or rules to determine configuration settings for resources associated with a cloud based application that may be dependent, at least in part, on the deployment context.

As used herein, the term "rule" refers to one or more conditions, which when evaluated, lead to actions that configure one or more resources. In some embodiments, a rule may simply specify a configuration of a resource associated with a cloud based application. In some embodiments, evaluation of the conditions or some subset of the conditions may result in a deployment context, which may include one or more additional conditions to be evaluated and/or resource settings. The term "subset" in reference to a set A refers to those sets (e.g. a set B) whose elements are also elements of A. Sets A and B may be coextensive. As one example, a rule may specify that a resource associated with a cloud based application be assigned some value when one or more conditions are true.

In some embodiments, the orchestration process may itself be distributed across several nodes, which may cooperate to orchestrate the cloud based application. In some embodiments, the distributed orchestration and deployment may be based on a cloud agnostic or cloud independent representation, which may facilitate orchestration and deployment across one or more clouds. In some embodiments, the orchestrator may take the form of a Distributed Orchestration Engine (DOE), which may be cloud based. In some embodiments, the DOE may run on a plurality of nodes (e.g. VM servers), which may interface with the cloud infrastructure(s) or cloud provider(s) to deploy and/or manage cloud based applications. Accordingly, some disclosed embodiments, facilitate distributed orchestration in: (i) heterogeneous cloud computing environments, where a cloud based application may be deployed across several cloud types (e.g. from different cloud providers and/or different cloud architectures and/or different cloud implementations) using a cloud agnostic representation of the cloud based application; and (ii) across several deployment contexts for each of the plurality of clouds. In some embodiments, the DOE may facilitate distributed orchestration across multiple distinct clouds and multiple deployment contexts, based, in part, on a cloud agnostic representation of the cloud based distributed computing application that captures underlying patterns of execution and resource utilization, orchestration sequences, and deployment-context sensitive information.

As used herein, the terms "cloud independent representation" and "cloud agnostic representation" are used synonymously and refer to a representation of a distributed computing application that may be deployed on a plurality of clouds. The "cloud independent representation" or "cloud agnostic representation" may include a representation of an underlying pattern of execution and/or resource utilization of the distributed computing application. In some embodiments, the "cloud independent representation" or "cloud agnostic representation" may take the form of application descriptors and/or metadata that are not specific to any particular cloud. The "cloud agnostic representation" or "cloud independent representation" may be used to obtain cloud specific commands and/or parameters at the time of orchestration and/or deployment of the distributed computing application on a specific cloud in a manner consistent with embodiments disclosed herein. In some embodiments, metadata associated with the "cloud independent representation" or "cloud agnostic representation" may also capture a portion of the orchestration sequences, and/or deployment-context sensitive information. At deployment time, a cloud specific representation for deployment on a specific cloud in the heterogeneous cloud environment may be obtained automatically from the cloud agnostic representation based on the prevailing deployment context and without recoding, recompiling, and/or manual intervention during application deployment.

FIG. 2 illustrates an exemplary multi-tier cloud based application illustrating an initialization sequence based on service dependencies. The term multi-tier application refers to applications that exhibit and/or are structured in, tiers or layers, where each tier or layer may provide one or more services. Except where otherwise specified, the term "service" as used herein refers broadly to software that facilitates delivery of functionality, content etc, over a network (including, for example, web server services, database services, load balancing services, caching services etc) and/or applications which may include standalone program code and/or program code that functions in combination with one or more of the above "services".

The term "services" is also used to refer to Virtual Machine Images (VMIs), which may be provided as IaaS. In some embodiments, VMIs may include service binaries and descriptors describing service phases and commands to be executed at various phases (e.g. before or after installation, startup, migration, shutdown, etc). In addition, "services" may also include "end-point based services," which may be provided as PaaS. As indicated earlier, the term "end point based service" or PaaS is used to refer to categories of services where the service provider makes available both a computing platform and a solution stack associated with the platform as a service to users. End-point based services may be available, for example, from one or more vendors. External endpoint based services or external endpoints refer to services that are external to a cloud based application (e.g. a multi-tier cloud based application), where the services are accessible from within the cloud based application. For example, an end-point based service such as Amazon Relational Database Service (RDS) provided by Amazon may be used to set up a cloud based relational database that is accessible to and/or may be used by a deployed cloud based multi-tier application generated from cloud agnostic representation of multi-tier application.

For example, a multi-tier application may include three tiers, which may take the form of a web tier, application tier, and a database tier. Each tier may comprise one or more services. The web tier may provide services to manage incoming hypertext transfer protocol ("http") requests. The web-tier may serve the static content and make REpresentational State Transfer calls or RESTful calls to the application layer. REST is a stateless client-server, cacheable communications protocol, which may use the HTTP protocol to effect the creation, updating, reading, and/or deletion of data. The application tier may provide application specific services such as business logic based on input received from the web tier and services to generate queries to and/or process response received from the database tier. Services in the database tier may process queries received from the application tier, retrieve data from a database, and send query responses to the application tier, which, in turn, may process the received responses and provide the processed data to the web tier. Further, each tier in the multi-tier cloud based application may include one or more IaaS, and/or PaaS, and/or SaaS components. In some embodiments, a multi-tier application may be structured or configured so that application components in one tier of the multi-tier application may be dependent on one or more components in an immediately preceding tier. The term "component", when used in the context of an application, is used herein to refer to a discrete unit of a cloud based application. A component may include one or more additional components. For example, a component may be a service, a nested application within a larger application, standalone program code, etc.

The term "service cluster" is used to refer to a collection of distributed services, which may be deployed together. Services in the service cluster may be clustered for operational and/or functional reasons, for example, on account of business or technological commonalties. Service clusters may be viewed as an affiliation of services and a combination of their functionalities to solve a business and/or technological problem.

As shown in FIG. 2, there may be dependencies between services in different application tiers in a multi-tier application. The application topology of a multi-tier application may include a representation of the tiers, the services in each tier and the dependencies between services in the multi-tier application. Multi-tier cloud based applications are used widely in a variety of areas including e-Commerce, Business-to-Business, Banking and Financial, Retail and Social Networking etc. Each application/class of applications may have different deployment configurations with web servers, application servers and database servers.

In general, for an application that includes a plurality of components, the term "application topology" refers to the pattern of dependencies between the components. For example, these dependencies may determine sequences specific to starting, running, migrating, updating, terminating and/or performing other actions related to the multi-tier cloud based application. In some embodiments, the dependencies may also specify and/or be used to obtain a sequence of events to integrate an application with one or more clouds.

In FIG. 2, exemplary multi-tier application 100 includes three-tiers 150, 160, and 170. Services S3 130 and S4 140 are in a first tier 150, while services S2 120 and S1 110 are in tiers 160 and 170, respectively. Typically, for a multi-tier application if services with no dependencies are considered as being in Tier 1, then services in Tier i for i>1 depend on services in Tier (i−1). A tier i may include one or more services. Tiers may be scalable. Scalability refers to the property by which a tier i (which may be viewed as a cluster of services termed a service cluster) can be instantiated and run concurrently in multiple VMs.

Further, as shown in FIG. 2, service S2 120 depends on services S3 130 and S4 140, while service S1 110 depends on service S2 120. Therefore, based on the dependency information, an initialization sequence for services S1-S4 may be determined. Accordingly, initialization of S2 120 may start after S3 130 and S4 140 have been initialized, and initialization of S1 may commence after S2 has initialized.

The dependencies in a multi-tier application may be used to determine an order or sequence for starting services in the multi-tier application. In general, dependency information may include information about pre-requisites for starting, deploying and/or running a service. Dependency information may include information about service dependencies, residence dependencies, runtime dependencies, resource dependencies etc. The term "prerequisites" when used in relation to a service or component of a cloud based application refers to an ordered set of events that are performed prior to performing some specified operation related to the service or component. When the events in an ordered set associated with a component or a service have been performed, the prerequisites for that component may be satisfied and the specified operation may be performed.

The ordered set of events may include a list of events and specify a sequence for initiating execution of the events in the ordered set. For example, referring to FIG. 2, service S2 120 may be started when services S3 130 and S4 140 have been started. The sequence may include events in the ordered set that may be started or executed concurrently or in parallel. For example, services S3 130 and S4 140 may be started in parallel, after which service S2 120 may be started. Service S4 140 may be started after its prerequisites given by the set of services S4 140, S3 130, and S2 120 have all been started. If an operation on a service or component may be performed without regard to other events, then, that service or component may have no prerequisites and the ordered set may be empty.

As a further example, based on the service dependency information, some services may be started concurrently during deployment, whereas the start up of other services that depend on one or more prerequisite services may be held back until the respective prerequisite services are running or have been started. In some embodiments, resource dependency information associated with a service may be used to determine when the service may be started. As another example, resource dependencies associated with a service may specify when the service may be started.

In general, the prerequisites for a service or component may include: temporal dependencies, which are events to be completed by a time when some operation is performed on the service or component; and/or resource dependencies, which are resources to be available when the operation is performed on the service or component; and/or placement dependencies, which may specify a distribution of one or more other application components on the cloud when the operation is performed on the service or component. Although multi-tier applications are used in various illustrative examples, the techniques here may be applied generally to the deployment and/or orchestration of various other cloud based applications.

Figure 3:
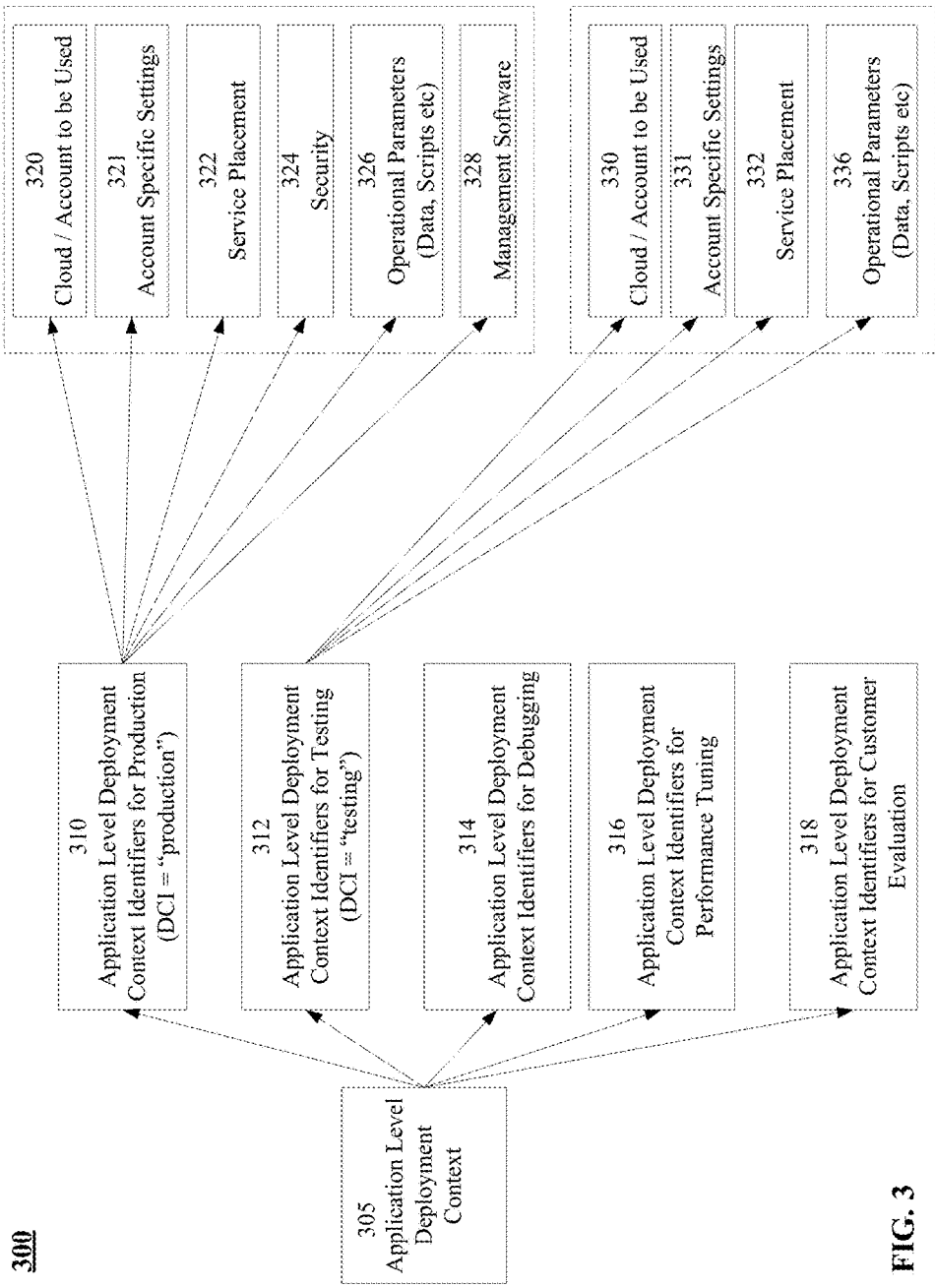
FIG. 3 shows an exemplary logical structure of some deployment contexts associated with an application.

FIG. 3 shows an exemplary logical structure 300 of some deployment contexts associated with an application. As shown in FIG. 3, each deployment context may be associated with a corresponding name or Deployment Context Identifier (DCI), which identifies the deployment context.

In general, a DCI associates a resource such as a cloud based application, cloud infrastructure, or services with a deployment context. In some embodiments, a DCI may associate a set of resources (e.g. a service cluster) with a deployment context.

A deployment context may be identified using a DCI, which may be also associated with: an optional description of the deployment context, metadata such as owner and access control permission lists, a set of encapsulated data, and rules associated with the context. The rules may specify conditions, which when satisfied, result in some specified configuration of one or more resources (application, cloud, service etc) associated with the deployment context. In some embodiments, the deployment context may be used by an orchestrator to configure resources associated with the deployment context in the manner specified.

The conditions specified by rules may be static or dynamic. A condition may be considered static when the resource configurations for a context are known or fixed, and/or parameters influencing evaluation of the condition do not change. For example, some or all cloud based applications associated with an application testing group, may be associated by default with a "TEST" deployment context, which may cause deployment of the cloud based applications on a resource e.g. a public "Cloud A" in a configuration determined by the "TEST" deployment context.

The conditions may be dynamic in that evaluation of the conditions may require determination of environmental factors at the time of deployment of the cloud based application. For example, some or all cloud based applications associated with an application production group, may be associated by default with a "PRODUCTION" deployment context, where the cloud on which the cloud based application is deployed may be dynamically determined based on cloud pricing or other factors at deployment time. Therefore, when a condition specified by a rule is dynamic, the deployment context may change based on the environmental parameters at deployment time.

In some embodiments, evaluation of the conditions may include one or more of: matching or comparing parameters and/or an application-level, cloud-level, and/or service level DCIs associated with the cloud based application; the invocation of a callout script to return a "yes"/"no" decision or provide other results, where the script may interact with external systems and accept input parameters; and/or the use of a cloud plugin to return "yes"/"no" or provide other results, where the plugin has a standard evaluation interface to take a deployment context as input and use plugin implementation logic to make decision. The term "cloud Plugin" or "plugin" in the context of a cloud refers to program code that may be used to invoke appropriate cloud Application Programming Interfaces (APIs) and routines from cloud specific libraries, which may yield information about the cloud environment, to which a cloud based application may be deployed.

As shown in FIG. 3, an application level deployment context 305 may capture a set of application parameter values as a group and the application level deployment context may be used to deploy the application. Because deployment contexts allow administrators or normal users to configure, select, and/or determine a deployment context, which automatically configures various resources associated with that deployment context, application deployment may be automated and the application may be provisioned autonomously. Thus, context sensitive cloud based application deployment is simplified, thereby greatly reducing deployment and maintenance time and mitigating the likelihood of human error.

Further, as shown in FIG. 3, an application level deployment context 305 may include several DCIs, each associated with a distinct deployment context. In some embodiments, application level deployment context 305 may be a global setting that applies to deployments of the application associated with a specific DCI. The DCI may be associated with parameters and/or rules for one or more resources associated with the application. At the time the cloud based application deployment is initiated, an orchestrator may configure the deployment based on a specified deployment context, which may indicated by the DCI. For example, rules and/or parameters associated with one or more resources may be set and associated with a DCI. At the time of application deployment, the orchestrator may deploy the one or more resources in accordance with the specified parameter settings and/or rules associated with the DCI.

For example, when a cloud based application is being deployed for production, such as for general use by customers, DCI 310 associated with the deployment context for the application may be set to "Production" (DCI="production"). For DCI="production", the cloud based application may be configured for deployment to a highly secure private cloud with a Service Level Agreement (SLA) guarantee, For example, Cloud/Account parameter 320 may be configured as Cloud="A" AND Account="Sales". Further, Account Specific Setting parameters 321 associated with cloud="A" and account="Sales" may be configured. For example, Account Specific Setting parameters 321 may specify settings for instance type, network, and/or subnet related to the above deployment context. Instance types are often used to specify some combination of CPU (e.g. type, speed, and/or number), memory (e.g. amount, minimum/maximum, speed), storage (e.g. solid state drive (SSD) or hard drive) and networking capacity (e.g. bandwidth/latencies) to facilitate an appropriate resource mix for applications. In some embodiments, Account Specific Settings 321 may specify an instance type. As another example, Account Specific Settings 321 may specify a subnet within a virtual network used by an organization/user on a cloud where the application is deployed.

Further, the application may be configured for deployment so that each service is placed on a separate VM by appropriately setting application level Service Placement parameters or Service Placement rules 322. In instances where the cloud based application is a multi-tier, for DCI="production", Service Placement rules 322 may be used to specify auto-scaling policies or rules for one or more application tiers. Accordingly, during deployment, orchestrator may configure the application on a cloud where it is being deployed so that number of VMs serving those tiers may be scaled up or down based on workload or demand.

In addition, application level Security Parameter/Rules 324 may specify firewall rules to allow a secure shell (SSH) tunnel from a production jumpbox and facilitate access to cloud based resources such as application VMs, application performance monitoring (APM) agents, log collection agents etc., which may be deployed with the application. A "jumpbox" may be a secure host configured to allow authorized user/administrators to "jump to" or access any of the above resources. For example, Security Rules 324 may specify the configuration for one or more ports on one or more VMs.

In some embodiments, for deployment context DCI="production", operational parameters 326 may be set, which specify one or more scripts or data files used at run time. Further, in some embodiments, for production, one or more rules for loading one or more management tools may be specified. For example, performance monitoring, load balancing, log data collection tools may be deployed for production.

FIG. 3 also shows other exemplary deployment contexts at the application level. For example, application level deployment context identifier "debugging" 314 (DCI="debugging"), application level deployment context identifier "performance tuning" 316 (DCI="performance tuning"), and application level deployment context identifier "customer evaluation" 318 (DCI="customer evaluation"), may be set.

FIG. 3, further shows exemplary application level deployment context identifier "testing" 312 (DCI="testing"). As shown in FIG. 3, the application configuration may change based on DCI="testing" relative to DCI="production". For example, for DCI="testing", Cloud/Account parameter 330 may be configured as Cloud="B" AND Account="Testing". Further, Account Specific Setting parameters 331 associated with cloud="B" and account="Testing" may be configured. For example, Account Specific Setting parameters 321 may specify appropriate settings for instance type, network, and/or subnet related to the above deployment context.

Further, the application may be configured for deployment so that all services are placed on a single VM by appropriately setting application level Service Placement parameters or Service Placement rules 332. Moreover, in some embodiments, for deployment context DCI="testing", operational parameters 336 may specify one or more scripts or data files used at run time, which may be different from those used for DCI="production".

In some embodiments, resource configuration may be specified directly based on the values of one or more parameters associated with resources being deployed. In some embodiments, result(s) or value(s) returned by a script or an agent may be used to determine context. In some embodiments, the script or agent may accept input parameters, and/or interact with an external system to make a complex decision based on many parameters. In some embodiments, the deployment context may use a plugin to return "yes" or "no" decision and/or provide other results, where the plugin has a standard evaluation interface to take a deployment context as input and use the plugin implementation logic to make decision.

In some embodiments, the deployment context identifier may specify and/or include rules to specify one or more of: cloud and cloud provider accounts to be used when deploying a cloud based application; the placement and/or distribution of services across one or more VMs; cloud specific settings to be used for deployment of an application on a selected cloud; auto-scaling, auto-shutdown, terminate protection policies that apply to a deployment; security settings to be applied to the deployment; and/or additional components that may need to be installed when the cloud based application is deployed.

The rules associated with a deployment context for a cloud based application may specify conditions, which may be evaluated automatically and based on the evaluation, one or more resources or a set of resources associated with the deployment context for the cloud based application may be configured. In a heterogeneous environment, where a cloud based application(s) may be deployed on any one of a plurality of distinct cloud providers, the deployment contexts, which may be rule based, facilitate automated orchestration and deployments. Further, when the cloud based applications are represented in cloud agnostic form, the deployment contexts further leverage the flexibility of deployment of the cloud agnostic representation with automated deployment context based orchestration and deployment of the application.

In some embodiments, rule-based deployment contexts may be used to facilitate Continuous Integration Continuous Deployment (CICD) applications on hybrid cloud. For example, development and testing may be performed on a public cloud, while production deployment of the cloud based application is performed concurrently on a private cloud.

In some embodiments, rule based deployment contexts may facilitate autonomous application provisioning. For example, an administrator may predefine one or more contexts and define rules (explicitly, via scripts/agents, and/or through plugins) associated with resources for each deployment context. The rules may be used determine a configuration of resources associated with the deployment context and provision the application autonomously. For example, rules may be associated with resources for a deployment context based on a user's role (e.g. developer, tester, etc), permissions (e.g. which deployment contexts the user's may access/use), location (e.g. geography) and/or other metadata information. Based on the context and rules associated with the resources, the application will be automatically deployed to an appropriate cloud, with correct configuration settings, and without user intervention or interaction to determine application configuration settings.

For example, a combination of cloud, region and cloud account may be encapsulated as a deployment context. A cloud-level deployment context can capture the cloud and account specific settings such as instance type, resource pool, data store location, network, etc. A security resource deployment context can capture the additional ingress and egress firewall rules to be applied to an application tier in a multi-tier application. A placement resource deployment context may specify or map application services to VMs. In some embodiments, placement resource deployment context may span multiple clouds. For example, for a three-tier application "production" deployment, the web and application tier may be placed on a public cloud, but the database tier may be placed on a private cloud, for example, to facilitate increased security and for other compliance (e.g. legal, administrative, application performance) reasons. In some embodiments, a deployment context may be set by the user and/or determined based on input from agents. For example, for a first DCI="production," a cloud agent may report on price, performance, load and other metrics for several clouds and the choice of cloud may be set to "Cloud A" based on the reported metrics. For example, application level Cloud/Account parameter 320 may be set to "Cloud A". Further tailoring of the deployment may then occur, based on the currently selected deployment context given by "production" AND "Cloud A".

For example, in some embodiments, the deployment context may specify one or more additional configuration management services or application management services to be invoked that are available for "Cloud A" but which may not be available for "Cloud B". As another example, security rules may be cloud specific and specify anti-virus services and/or Host Intrusion Protection Services specific to Cloud B.

In general, rules in relation to deployment context may be specified at various levels of granularity, at the application level, cloud level, service group level (e.g. for a service cluster), and/or at the individual service (e.g. service) level. The examples above merely illustrate deployment contexts for two resources—Applications and Clouds—but the disclosed techniques may be extended to any resource in a similar fashion.

In some embodiments, because the deployment context for deployment of a cloud based application may be determined based on contemporaneous input from agents etc., the deployment contexts may be dynamically determined or adjusted. For example, if an agent reports that "cloud A" is currently priced lower than a "cloud B", DCI 320 may be set to "Cloud A" and deployment context may be "production" AND "Cloud A". At another time, if the agent reports better metrics for Cloud B, then the application may be configured for deployment on Cloud B and the deployment context may be "production" AND "Cloud B".

Figure 4:
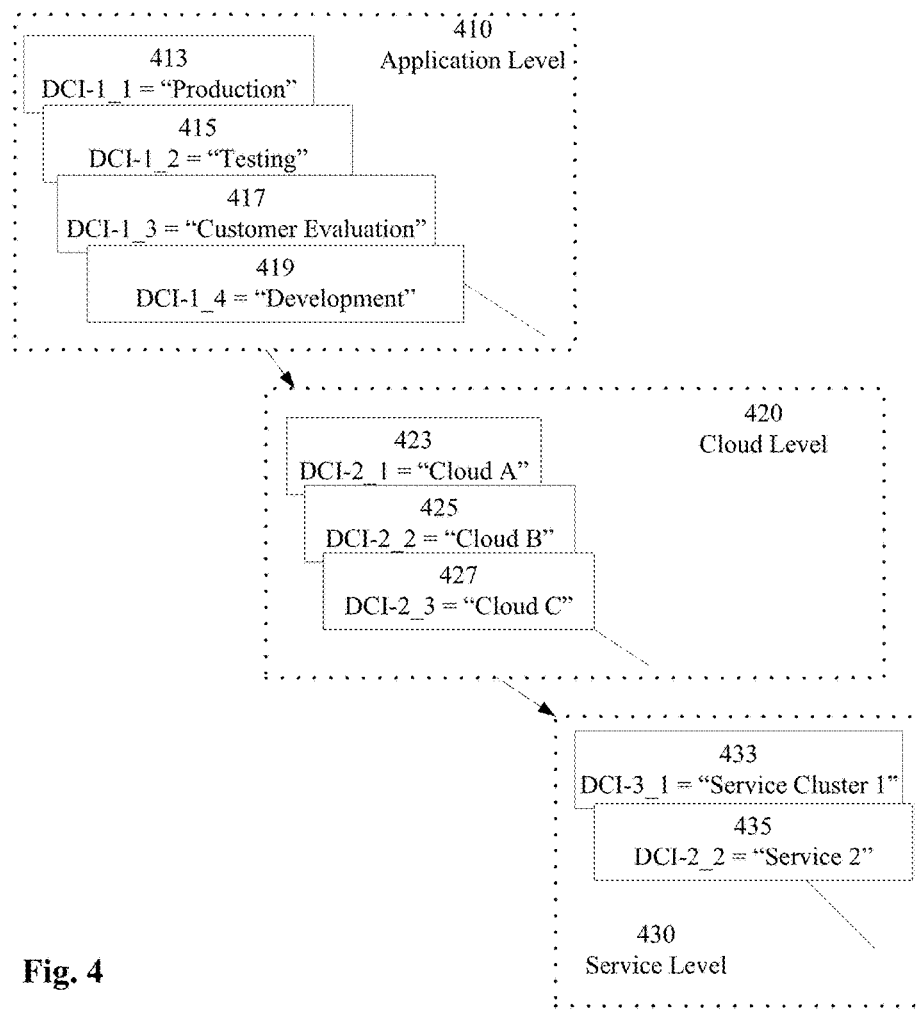
FIG. 4 shows several exemplary hierarchically structured Application Level deployment contexts.

In FIG. 3, the exemplary deployment context is shown as a hierarchy, where a DCI is associated with a resource at a level in the hierarchy. This is also illustrated in FIG. 4, which shows Application Level deployment contexts 510, with deployment contexts identified by DCI-1_1="Production" 413, DCI-1_2="Testing" 415, DCI-1_3="Customer Evaluation" 417, and DCI-1_4="Development" 419 etc. Further, as shown in FIG. 4, Cloud level deployment contexts 420 with associated deployment contexts identified by DCI-2_1="Cloud A" 423, DCI-2_2="Cloud B" 425, and DCI-2_3="Cloud C" 427 etc. FIG. 5A also shows service level deployment contexts 430 with associated deployment contexts identified by DCI-3_1="Service Cluster 1" 433, DCI-2_2="Service 2" 435, etc.

In FIG. 4, a deployment context for a cloud based application may be specified by associating one of the deployment contexts at the application level, with a deployment context at the cloud and/or service level. The exemplary schema in FIG. 4 is flexible in that a new deployment context may quickly be created by associating one or more of the previously defined deployment contexts. For example, a deployment context may use DCI-1_1="Production" 513 and (for example, when an agent reports that "cloud B" is currently priced lower than a "cloud A") DCI-2_2="Cloud B" 425 may be associated to create a deployment context identified as (DCI-1_1 AND DCI-1_2). Other deployment contexts may also be created, for example, (DCI-1_1 AND DCI-1_2 AND DCI-3_1), by logically combining deployment contexts from different levels of hierarchy.

However, as one of skill in the art would appreciate, a deployment context may also be specified using other schema consistent with disclosed embodiments. For example, when the number of deployment contexts is not large, deployment contexts may be defined for each distinct desired configuration. For example, the deployment contexts may take the form of a flat structure with single DCI corresponding to each distinct configuration. For example, an application level DCI-1_1_5 510 could be defined for production runs of the cloud based application on Cloud A, another application level DCI-1_1_6 520 for testing of the cloud based application on Cloud B with a defined configuration of Service 2, and a third DCI-1_7 530 for customer evaluations with a defined configuration of Service Cluster 1.

Figure 5:
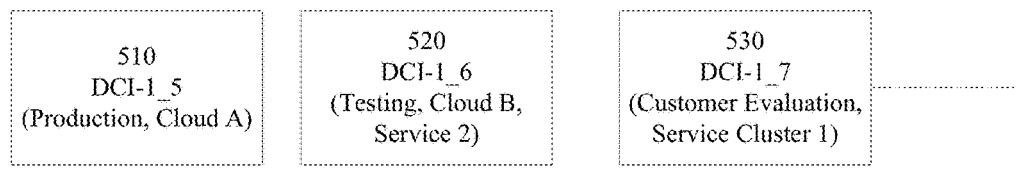
FIG. 5 shows exemplary application level deployment contexts to facilitate capture of configuration settings for resources associated with a cloud based application.

Accordingly, in FIG. 5, in some embodiments, exemplary deployment context DCI 1-1_5 510 may be used to capture some or all configuration settings (or include rules to determine those settings) at the application level for production runs of the cloud based application on Cloud B, whereas exemplary deployment context DCI-1_1_6 520 may be used to capture some or all configuration settings for testing of the cloud based application on Cloud B with a defined configuration of Service 2, while exemplary deployment context DCI-1_7 530 may be used to capture some or all configuration settings for customer evaluations with a defined configuration of Service Cluster 1 on one or more clouds. In some embodiments, the schema used for defining deployment context may depend on the level of granularity and/or flexibility desired.

Figure 6A:
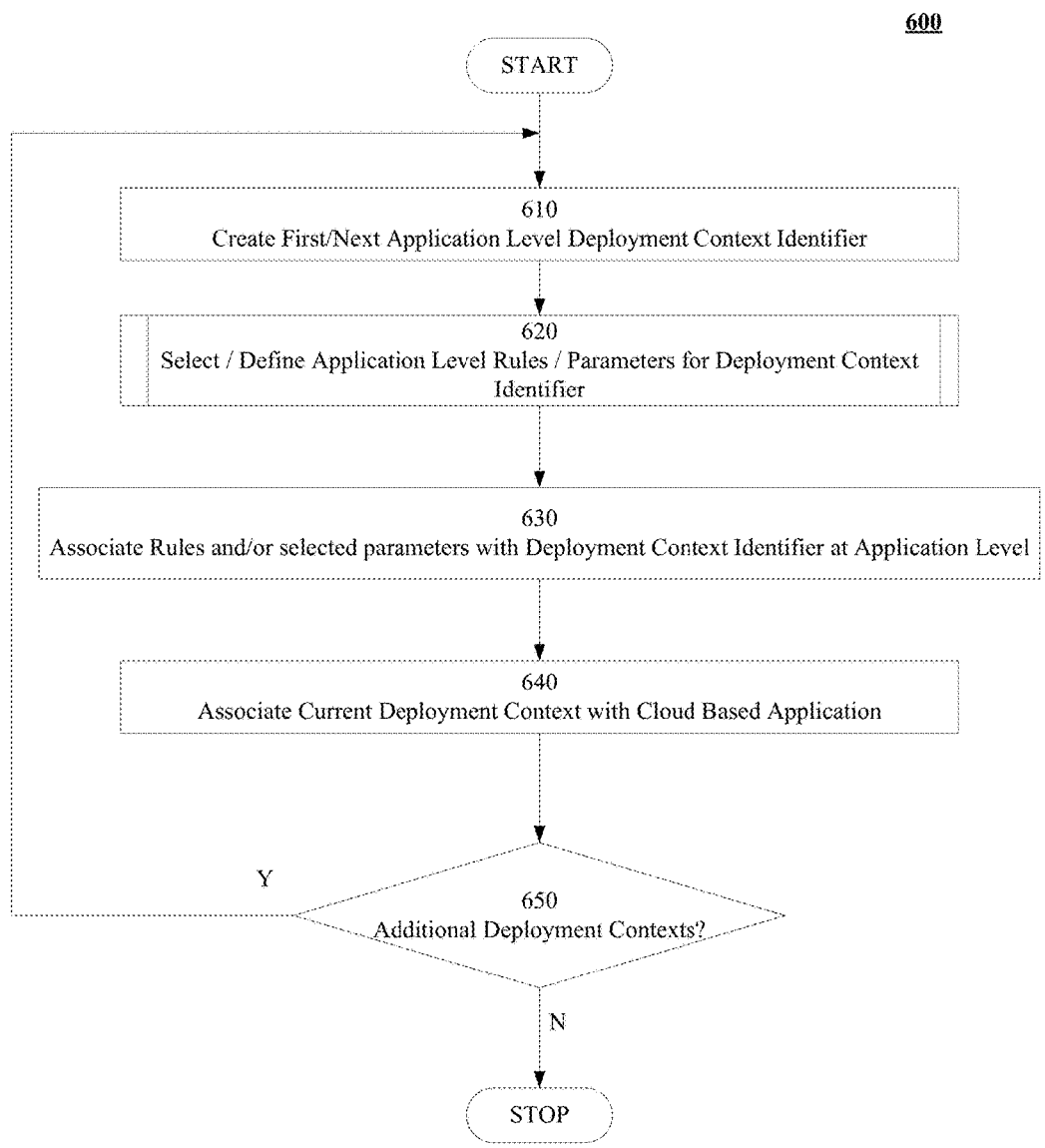
FIGS. 6A, 6B and 6C show a flowcharts of exemplary methods of obtaining deployment-context sensitive rules, parameters and/or settings and associating the obtained deployment context information with a cloud based application.

FIG. 6A shows a flowchart of an exemplary method of obtaining deployment-context sensitive rules, parameters and/or settings and associating the deployment context information with a cloud based application. In some embodiments, the method may be performed on a computing device and/or processor.

In some embodiments, in step 610, a first or next DCI for an application may be created to represent a deployment context. Next, in routine 620, application level rules, parameters or settings for the current DCI may be selected or defined.

For example, in some embodiments, some or all settings associated with a deployment context (and/or rules to determine those settings) may be specified. In some embodiments, the settings (and/or rules to determine those settings) associated with the application level DCI (defined in step 610) may be specified by a user in deployment context file(s), an application profile, or selected using a graphical user interface (GUI). For example, in some embodiments, settings and/or rules associated with the DCI may be generated by selecting, combining, and/or modifying previously defined deployment contexts.

Figure 6B:
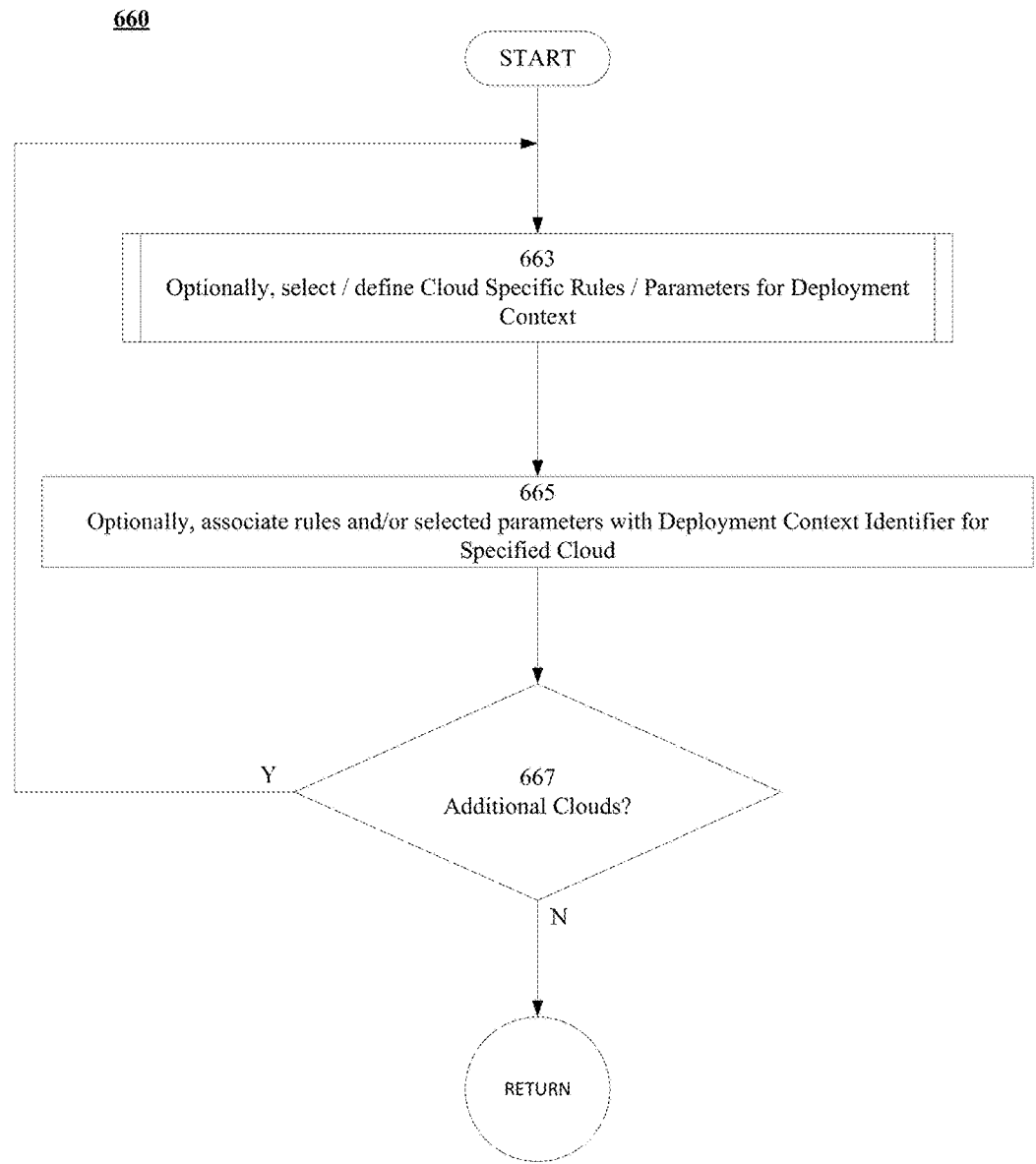
Figure 6C:
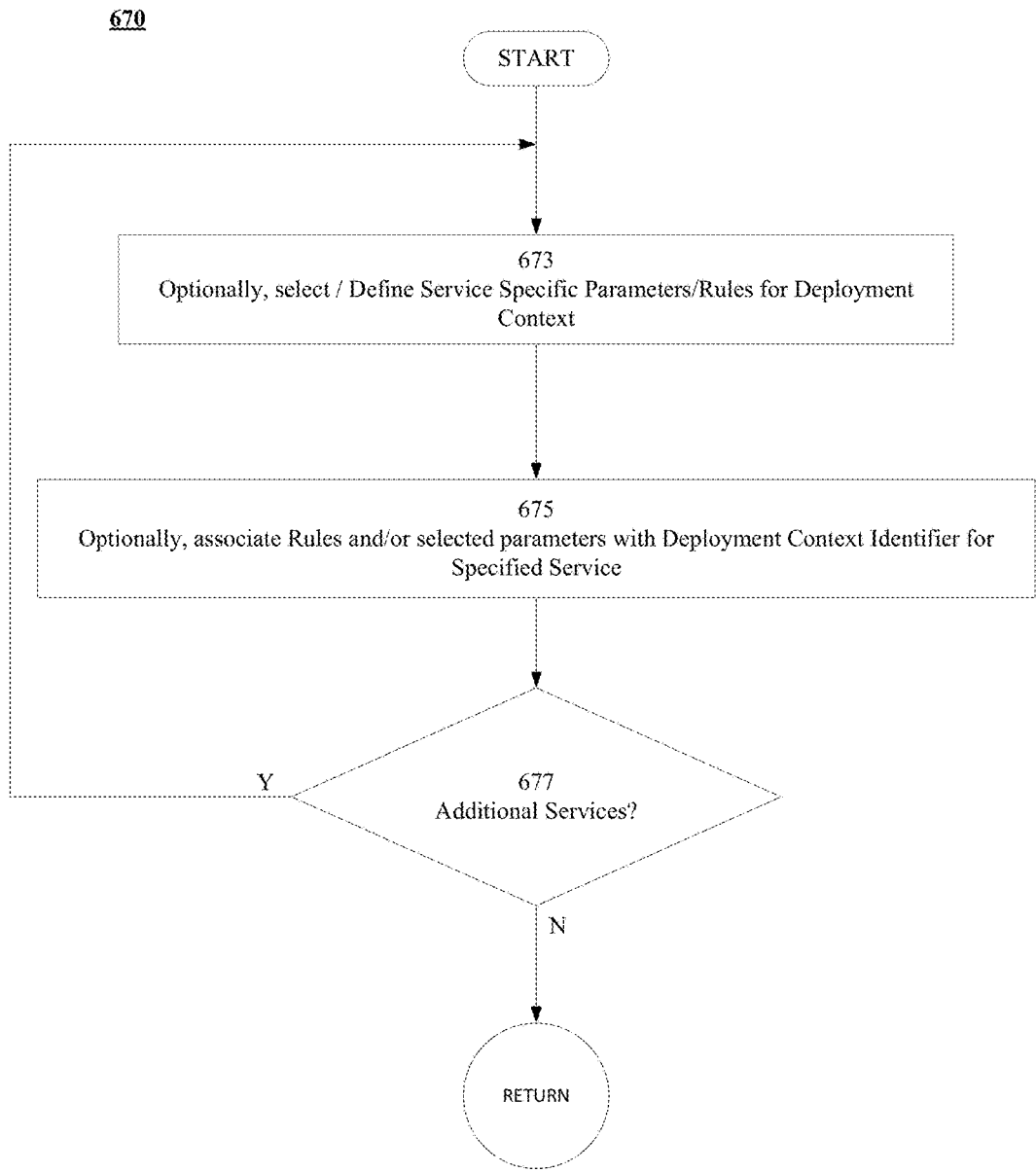

In some embodiments, routine 620 may optionally invoke routine 660 (FIG. 6B) and/or routine 670 (FIG. 6C). For example, if a user wants to specify deployment contexts in a hierarchical manner, then, routine 660 and/or routine 670 may be invoked. In one embodiment, routine 620 may specify a deployment context at the application level (e.g. application level 410 in FIG. 4) and invoke routine 660 to specify or select a deployment context at the cloud level (e.g. cloud level 420 in FIG. 4) and/or invoke routine 670 to specify or select a deployment context at the service level (e.g. service level 430 in FIG. 4).

For example, in one embodiment, a "catalog" of deployment contexts at various resource levels (e.g. application, cloud, service cluster, service etc) may be maintained and a new deployment context may be created by selecting the context and adding the selected deployment context to the current deployment context.

In step 630, the rules, parameters or settings may be saved and/or associated with the deployment context identifier at the application level.

In step 640, current deployment context, which is identified by the current DCI may be associated with the cloud based application. In step 650, if there are additional deployment contexts ("Y" in step 650), another iteration is begun from step 610 for the next corresponding deployment context and DCI. Otherwise ("N" in step 650), the method terminates.

Referring to FIG. 6B, in routine 660, cloud specific parameters, settings or rules may optionally be specified for a deployment context at the cloud level and associated with the current deployment context identifier.

In routine 663, cloud level rules, parameters or settings for the current DCI may be selected or defined. In some embodiments, settings or rules associated with the cloud level deployment context may be generated by selecting, combining, and/or modifying previously defined deployment contexts. In some embodiments, routine 660 may optionally invoke routine 670 (FIG. 6C). For example, if a user wants to specify deployment contexts in a hierarchical manner, then, routine 670 may be invoked.

In step 665, the rules, parameters or settings may be saved and/or associated with the current deployment context/ deployment context identifier at the cloud level. In step 667, if there are additional deployment contexts ("Y" in step 667), another iteration is begun from step 663 for the next corresponding cloud level deployment context. Otherwise ("N" in step 667), control may be returned to the calling routine.

Referring to FIG. 6C, in routine 670, service specific parameters, settings or rules may optionally be specified for a deployment context at the service level for one or more services and associated with the current deployment context identifier.

In routine 673, service level rules, parameters or settings for the current DCI may be selected or defined. In some embodiments, settings or rules associated with the service level deployment context may be generated by selecting, combining, and/or modifying previously defined deployment contexts.

In step 675, the rules, parameters or settings may be saved and/or associated with the current deployment context/ deployment context identifier at the service level. In step 677, if there are additional service level deployment contexts ("N" in step 677), another iteration is begun from step 663 for the next corresponding service level deployment context. Otherwise ("N" in step 677), control may be returned to the calling routine.

Figure 7:
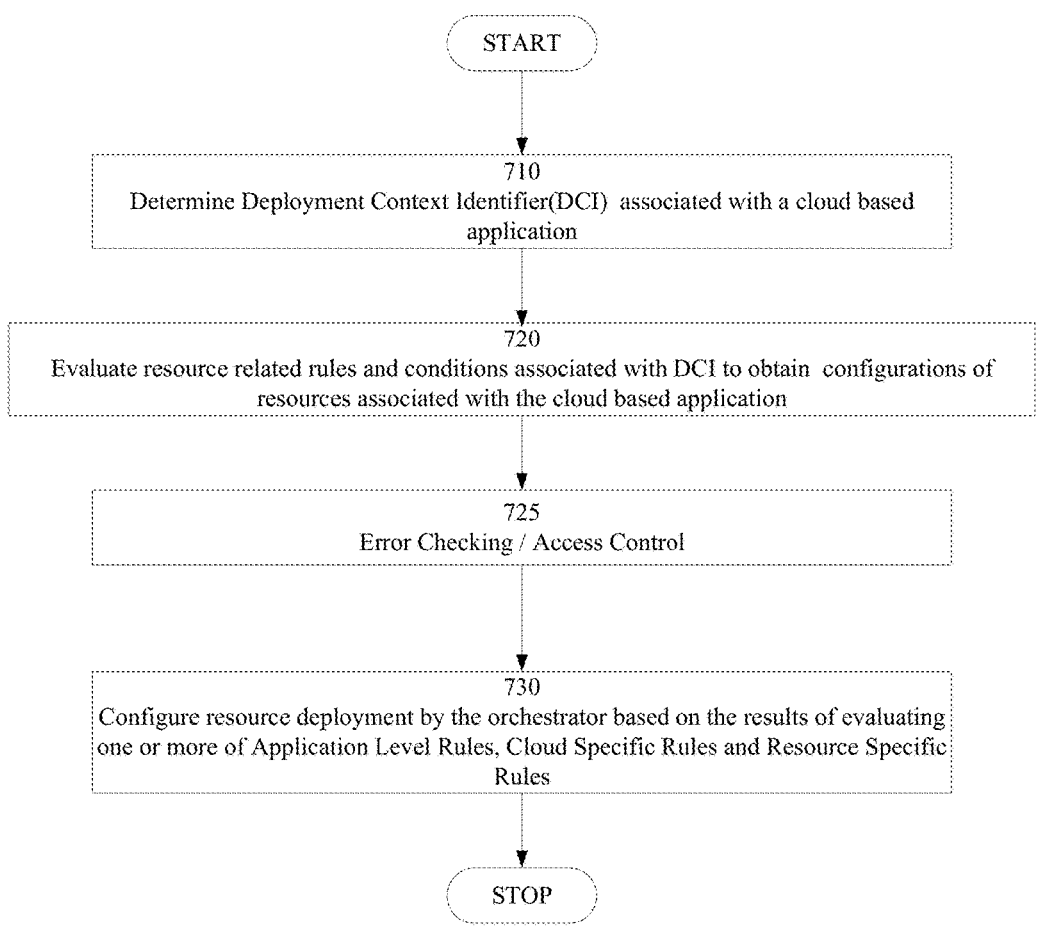
FIG. 7 shows an exemplary method 700 of deploying a cloud based application based on a deployment context in a manner consistent with disclosed embodiments.

FIG. 7 shows an exemplary method 700 of deploying a cloud based application based on a deployment context in a manner consistent with disclosed embodiments.

In step 710, the DCI associated with a cloud based application may be determined. For example, the DCI may be specified by a user as a parameter when the cloud based application is invoked. In some embodiments, the DCI may be determined automatically based on a status, profile or group associated with a user. For example, if the user belongs to group "testing", then the DCI may automatically be set to "testing". The DCI may also be determined based on the IP address, domain, or identity of a computer from where the cloud based application is launched. In some embodiments, the DCI may be determined based on geographic location associated with a user (e.g. in a user profile) and/or as determined based on IP address or other parameters. In some embodiments, the DCI may be determined based on logic associated with one or more parameters, such as the exemplary parameters above.

As another example, a combination of cloud, region and cloud account may be encapsulated as a deployment context. A cloud-level deployment context can capture the cloud specific settings such as instance type, resource pool, data store location, network, etc. A security resource deployment context can capture the additional ingress and egress firewall rules to be applied to an application tier in a multi-tier application. A placement resource deployment context may specify or map application services to VMs. In some embodiments, placement resource deployment context may span multiple clouds.

In step 720, one or more resource related rules associated with the DCI may be evaluated. For example, the rules may specify conditions, which when evaluated determine configurations of resources associated with the cloud based application. Accordingly, based on the evaluation configurations for resources associated with the cloud based application and deployment context (DCI) may be determined. In some instance, the configurations of resources may be directly provided as part of the deployment context. In some embodiments, rules may be evaluated at one or more of the application level, cloud level and/or service level.

In some embodiments, result(s) or value(s) returned by a script or an agent may be used to dynamically determine configurations of resources and/or a deployment context at a level (application, cloud, and/or service). In some embodiments, the script or agent may accept input parameters, and/or interact with an external system to make a complex decision based on many parameters. In some embodiments, the deployment context may use a plugin to return "yes" or "no" decision, where the plugin has a standard evaluation interface to take a deployment context as input and use the plugin implementation logic to make decision.

The rules/conditions associated with a deployment context for a cloud based application may be evaluated automatically and used configure one or more resources or a set of resources associated with the deployment context for the cloud based application. In a heterogeneous environment, where a cloud based application(s) may be deployed on any one of a plurality of distinct cloud providers, the deployment contexts, which may be rule based, facilitate automated orchestration and deployments. Further, when the cloud based applications are represented in cloud agnostic form, the deployment contexts further leverage the flexibility of deployment of the cloud agnostic representation with automated deployment context based orchestration and deployment of the application.

In some embodiments, rule-based deployment contexts may be used to facilitate Continuous Integration Continuous Deployment (CICD) applications on hybrid cloud. For example, development and testing may be performed on a public cloud, while production deployment of the cloud based application is performed concurrently on a private cloud.

In some embodiments, rule based deployment contexts may facilitate autonomous application provisioning. For example, an administrator may predefine one or more contexts and define rules (explicitly, via scripts/agents, and/or through plugins) associated with resources for each deployment context. The rules may be used determine a configuration of resources associated with the deployment context and provision the application autonomously.

For example, rules may be associated with resources for a deployment context based on a user's role/group (e.g. developer, tester, etc), permissions (e.g. which deployment contexts the user's may access/use), location (e.g. geography) and/or other metadata information. Based on the context and rules associated with the resources, the application will be automatically deployed to an appropriate cloud, with correct configuration settings, and without user intervention or interaction to determine application configuration settings.

In some embodiments, in step 725, error checking may be performed. For example, referring to FIG. 4, a user may create a new deployment context using preexisting contexts, such as, for example, using DCI-1_1 413 "Production", DCI-2_2 "Cloud B" 425 and DCI-3_1 "Service Cluster 1" 433. In such a scenario, the user may not have permission or access to use or configure resources associated with the cloud based application in the manner specified by one or more deployment contexts. As another example, the configurations may exceed a budget specified for the user. Accordingly, in some embodiments, error checking step 725 may ensure that the user or user group deploying the application has any authorizations to deploy the cloud based application with application resources configured in the manner specified by the DCI.

In step 730, the configuration settings obtained in step 720 may be used to configure resources, so that resources may be appropriately configured by the orchestrator when deployed. For example, a service cluster at some tier of a multi-tier application may be configured to be "scaled" when deployed by an orchestrator for a "production" deployment context, while the same service cluster may reside on a single VM with no scaling when deployed in a "testing" deployment context. In some embodiments, the configuration settings and/or rules that are dynamically evaluated by the orchestrator may be associated with resources and may be set in a format understood by the orchestrator.

In some embodiments, one or more of the configuration settings may be associated with resource deployment events. For example, a "Workflow Descriptor" file may be used by the orchestrator and when the resource deployment event is triggered, the configuration settings in the Workflow Descriptor file may be applied prior to, during, and/or after deployment of the resource. In some embodiments, the Workflow Descriptor file may be described in a cloud agnostic manner and cloud specific implementations of various actions specified in Workflow Descriptor may be obtained using a cloud standardization layer.

Figure 8:
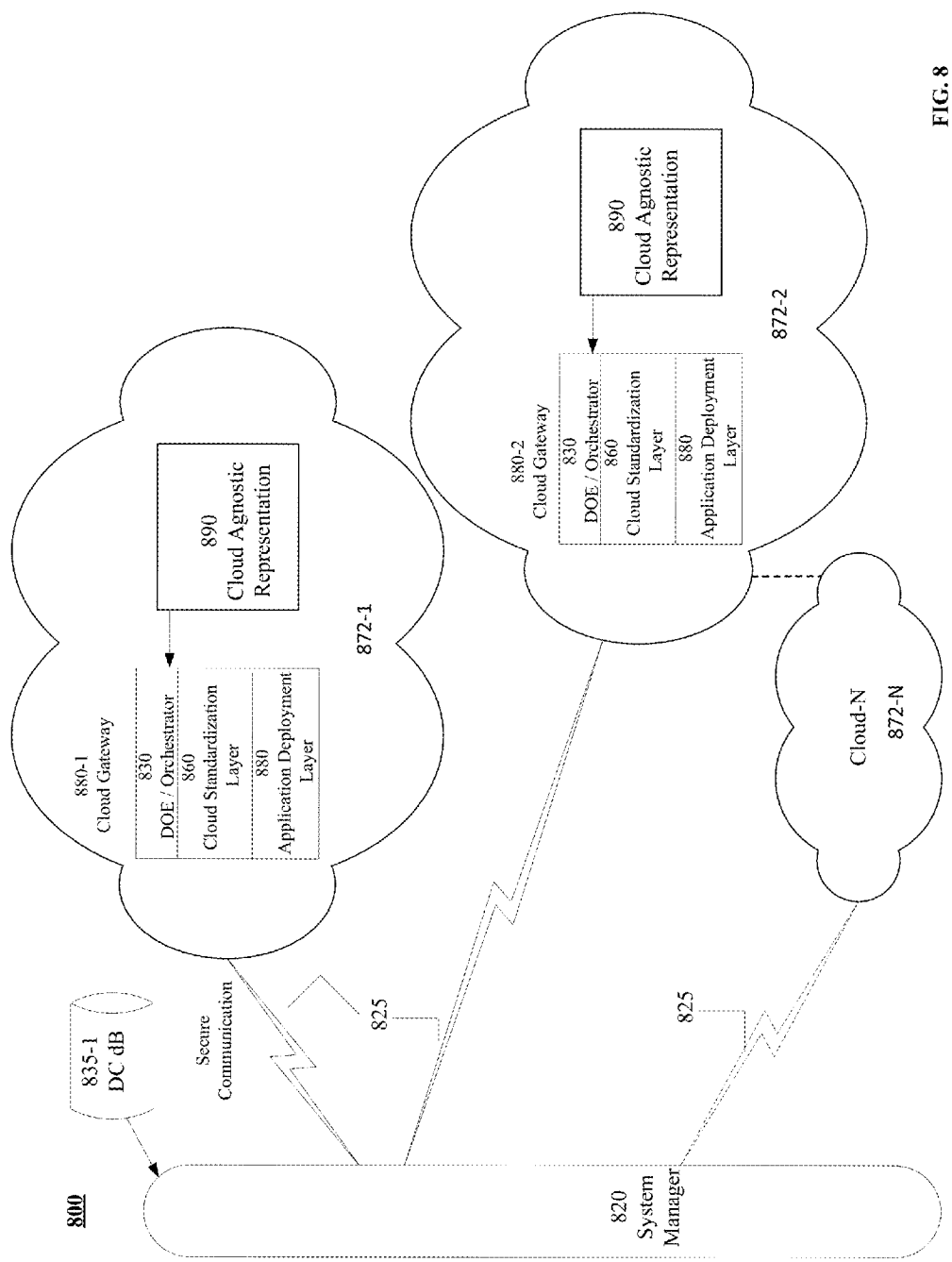
FIG. 8 shows an exemplary system 800 for orchestration and/or deployment of cloud based applications with deployment context identifiers in system.

FIG. 8 shows an exemplary system 800 for orchestration and/or deployment of cloud based applications with deployment context identifiers in system. In some embodiments, the cloud based applications and the configuration settings associated or determinable based on the DCIs may be specified in a cloud agnostic manner. The cloud agnostic representation of the cloud based distributed computing application may then be deployed based on a current deployment context on a plurality of clouds in a manner consistent with disclosed embodiments.

System 800 shown in FIG. 8 is used merely exemplary and is used to illustrate the operation of some disclosed embodiments. Techniques and embodiments disclosed may also be used in conjunction with various other cloud based architectures and/or distributed computing systems. As shown in FIG. 8, system 800 may include System Manager 820, Distributed Orchestration Engine (DOE)/Orchestrator 830, Cloud Standardization Layer 860, Application Deployment Layer 870, and Cloud Gateway 880. In some embodiments, DOE/Orchestrator 830 may take the form of an orchestrator that runs on single processor or VM, and the orchestrator may perform all or part of method 700. In some embodiments, method 700 all or part of method 700 may be performed by a plurality of nodes/processors/VMs running DOE 830. In some embodiments, one or more modules in system 800 such as System Manager 820 may perform all or part of methods 600, 660, 670 and/or 700 individually or in combination with other modules.

System 800 may also include one or more clouds, which are shown as Clouds 872-1, 872-2 . . . 872-N and collectively referred to as Clouds 872. Clouds 872 may communicate with at least one System Manager 820 using communication links 825. Communication links 825 may facilitate secure communication between System Manager 820 and one or more of DOE/Orchestrator 830, Cloud Standardization Layer 860, Application Deployment Layer 870, and/or Cloud Gateway 880. System Manager 820 may be in communication with one or more clouds 872-i at any time.

In some embodiments, system 800 may also comprise cloud agnostic representations 890 of a cloud based distributed computing application. In some instances, the cloud based distributed computing application may be a multi-tier application. Cloud agnostic representation 890 may be used to obtain a cloud specific implementation of the multi-tier application. For example, cloud agnostic representation 890 of a multi-tier application may be used to obtain a cloud specific implementation for Cloud 872-1 and another (different) cloud specific implementation of the multi-tier application for cloud 872-2. System 800 may facilitate orchestration and deployment of cloud agnostic representations 890 of a cloud based distributed computing application based on a current deployment context in a manner consistent with disclosed embodiments.

In some embodiments, System Manager 820 may manage application topology information and coordinate with DOE/Orchestrator 830 o perform distributed orchestration/orchestration) of the cloud based application based on a current deployment context. For example, System Manager 820 may be used to specify, modify, delete and/or add one or more deployment contexts to DCI databases 835. The DCI associated with a deployment context may serve as a key or index to the record and/or information associated with a corresponding deployment context.

In some embodiments, System Manager 480 may maintain a relational database or data repository with information pertaining to system users including user authentication and authorization information; a list of clouds (872-1, . . . 872-N) and available cloud configurations for each cloud 872-i; information pertaining to applications/entities; policies that a user may have specified, etc. The information available to System Manager 820 may be provided on demand to DOE/Orchestrator 830 and/or to agents running on system 830. For example, System Manager may determine a deployment context and corresponding DCI based on user information, IP addresses etc, and provide the information to DOE/Orchestrator 830, which may use the DCI provided by System Manager to orchestrate the application workload accordingly. In some embodiments, Orchestrator/DOE 830 may determine the deployment context upon initiation of the application based on user credentials (e.g. a user account, user group, user profile, and/or sub-tenant information). In some embodiments, user credentials may be provided by one or more cloud agents, and/or other information provided by System Manager 820.

In some embodiments, a deployment context may be dynamically determined and/or altered at the time of deployment based on information provided by cloud agents. As one example, the information may be used by Orchestrator/DOE 830 to determine a cloud level deployment context. As one example, for a given deployment context, which may be provided by System Manager 820 based on information in DC database 835, some or all of the deployment context may be determined dynamically. For example, the cloud to be used may be determined dynamically based on information provided by one or more cloud agents to determine, for example, that Cloud 872-1 offers better performance and/or price-performance than cloud 872-2 and set a cloud level deployment context to Cloud 872-1. As another example, a default cloud for a deployment context DCI="Production" may be Cloud 872-1. However, if Cloud 872-2 is determined to offer better performance and/or price-performance than cloud 872-1 at application deployment time, then, the application may be deployed on Cloud 872-2 and may use a cloud level profile associated with Cloud 872-2.

In some embodiments, configuration parameters for a deployment context or rules to determine the configuration parameters for a deployment context may be associated with Workflow Descriptors and used by DOE/Orchestrator 830 when deploying the cloud based application. In some embodiments, System Manager 820 may receive, maintain, add and delete or modify deployment context information in Deployment Context (DC) databases 835.

In addition, System Manager 820 may also maintain dependency and configuration information, cloud information, application related information and other data such as job history, policies, etc., which may be stored in a cloud agnostic form for example in an application profile.

In some embodiments, System Manager 820 may also facilitate: user views of application files and data on shared storage, movement of application files and data to cloud storage, and functionality to synchronize the application files and data between clouds. In some embodiments, System Manager 420 may serve as a storehouse and manager of information pertaining to user activities. For example, System Manager 820 may act as a management layer to initiate and manage application deployment and monitoring activities.

In addition System Manager 820 may also manage automated tasks, which, in some embodiments, may have been initiated by DOE 830 and/or one or more nodes of DOE 830 (hereinafter termed "DOE 830"). System Manager 820 may also call or invoke functions implemented by DOE 830 in order to perform various system related activities.

In some embodiments, DOE/Orchestrator 830 may use a common application representation, such as cloud agnostic representation 890 of a multi-tier application, to deploy and run a given multi-tier application on any cloud, irrespective of implementation differences pertaining to the provisioning and utilization of application resources on the individual clouds, in part, by using functionality provided by Cloud Standardization Layer 860.

In some embodiments, DOE/Orchestrator 830 may facilitate the context based deployment, running, and monitoring of applications on various clouds. For example, DOE/Orchestrator 830 may dynamically launch cloud agnostic representations 890 of a multi-tier application on a selected cloud 872-$i$ for multi-tier application execution in response to an execute command entered by a user.

In some embodiments, DOE/Orchestrator 830 may facilitate context sensitive orchestration and deployment of cloud based distributed computing applications without interfering with or adding performance overhead to application execution. Accordingly, in some embodiments, cloud based distributed computing applications may be run, based on the deployment context, directly and natively on the cloud infrastructure. In some embodiments, based, in part, on input provided by DOE/Orchestrator 830 and Cloud Standardization Layer 860, Application Deployment Layer 870 may select resource and performance efficient cloud specific implementation for a cloud 872-$i$ (1≤$i$≤N), DOE/Orchestrator 830 may also maintain routines and other program code that implement algorithms for determining deployment context based configuration parameters (e.g. by running method 700) for a cloud based application, and by deploying, optimizing, managing and monitoring application runs on clouds. In some embodiments, routines and other functions performed by DOE/Orchestrator 830 may be managed and initiated by the System Manager 820 based on a deployment context. DOE/Orchestrator 830 may also report the status and results of the various orchestration activities to System Manager 820. In one embodiment, DOE/Orchestrator 830 may directly query System Manager 820 for information such as deployment context, application/user data, policies, and cloud information.

Tasks performed by DOE/Orchestrator 830 on Clouds 872 may be facilitated by Cloud Standardization Layer 860. For example, functionality provided by Cloud Standardization Layer 860 may facilitate the use of infrastructure independent representations of application code by DOE/Orchestrator 830. For example, Cloud Standardization Layer 860 may facilitate the use, by DOE/Orchestrator 830, of cloud agnostic representation 890 of a multi-tier application to deploy multi-tier applications. In some embodiments, the infrastructure independent or cloud independent or cloud agnostic program code may be common across all clouds 872 because Cloud Standardization Layer 860 may use Application Deployment Layer 870, which may comprise cloud specific Plugins, APIs, cloud agents and Cloud Specific Libraries, to perform tasks for DOE/Orchestrator 830 on any given cloud 872-$i$. In some implementations, the deployment and running of applications and the dynamic management of clusters and other cloud resources may be facilitated by Cloud Application Deployment Layer 870.

In some embodiments, the dynamic management of VMs, clusters and other cloud resources may be facilitated by using a node management service running on a "cloud coordinator/gateway" or "cloud gateway" or gateway 880 for a specific cloud 872-$i$. Gateway 880 may also maintain Cloud APIs and Cloud specific Libraries.

In some embodiments, Cloud Standardization Layer 860 may include functionality to facilitate standardization of library constructs (such as shared storage, network, cluster, security, etc.) across a variety of cloud providers. Although cloud providers may have provider-specific Application Programming Interfaces (APIs) and other infrastructure differences, Cloud Standardization Layer 860 may provide applications a cloud agnostic or a cloud infrastructure-independent view of resources, including compute, storage and network resources. For example, Cloud Standardization Layer 860 can be a repository for various functional modules that facilitate utilization of various resources (including shared storage, server types, clusters and features such as queues, security, etc.) by applications on each cloud in a cloud-agnostic manner.

In some embodiments, Cloud Standardization Layer 860 may maintain resource standardizations for various clouds, such as exemplary clouds 872-1, 872-2 . . . 872-N, as well as references to cloud-specific implementations of the standardizations for clouds 872.

In some embodiments, exemplary Cloud Standardization Layer 860 may also maintain service-level agreements (SLAs), capability information about each cloud resource, information pertaining to cloud availability, reliability, and security, and performance and pricing information. Information may be maintained by Cloud Standardization Layer 860 by using metadata XML files or databases, which, in some implementations, may be persistent. In some implementations, the capability information can be stored as {key, value} pairs in a database. Because individual clouds may have different capabilities for a standardized resource type, capability information may be indexed by cloud. In some embodiments, the information pertaining to SLAs, capability information about cloud resources may be obtained by Orchestrator/DOE 830, to evaluate rules and determine a configuration of one or more resources in relation to a deployment context, when orchestrating and/or deploying a cloud based application.

In some embodiments, the cloud agnostic application representation 890 may be common to a plurality of clouds and the application may be deployed on a specific cloud using cloud standardization layer 860. For example, the cloud agnostic application representation 890 may take the form of application descriptors (not shown) such as pattern and system primitives, which may be input to DOE 830. The pattern and system primitives may describe the execution patterns as well as node, storage, communication and network characteristics pattern and system primitives. Exemplary application descriptors can include information such as: application software and hardware requirements, application profile (whether memory intensive, Input-Output intensive, CPU intensive, etc.), specification of a distributed computing paradigm, application steps (for workflow style applications).

Cloud Specific Libraries and Cloud APIs may comprise a library of implementations for primitives and composite interfaces, respectively, for a specific cloud 872-$i$. In some embodiments, Cloud APIs and Cloud Specific Libraries may be invoked using Cloud Plugins. For example, Cloud Plugins may be used to invoke appropriate Cloud APIs and routines from Cloud Specific Libraries that facilitate the deployment and running of applications on Clouds 872, where the applications may have been described using application descriptors and standardized primitives from Cloud Standardization Layer 860.

In some embodiments, when an application is to be deployed, a gateway 880-$i$ may use Cloud APIs and Cloud Specific Libraries to perform deployment and execution tasks for cloud 872-$i$. For example, shared storage primitives on Cloud Standardization Layer 860 may lead to instantiation of a DFS shared storage implementation on an Amazon™ cloud, while instantiating the shared storage implementation on a SoftLayer™ cloud will set up NAS/SAN.

In some embodiments, gateway 880-*i* may also launch one or more agents (not shown), which can be deployed on Cloud 872-*i*. In some embodiments, functionality specified or configured by the user may be implemented by gateway 880, DOE/Orchestrator 830, and/or cloud Application Deployment Layer 870, which, in some implementations, may include software agents running on the various clouds 872. These software agents may monitor application runtime statistics, collect cloud related information such as but not limited to cloud load information, pricing information, security information etc., and/or collect information related to VMs and/or user actions.

In some embodiments, the agents may report the actions performed as well as other task status back to gateway 880-*i*, DOE/Orchestrator 830 and/or System Manager 820. For example, in one embodiment, the agent(s) may monitor, collect and/or report the collected information to one or more of gateway 880-*i*, Cloud Standardization Layer 860, DOE/Orchestrator 830 and/or System Manager 820.

In some embodiments, information including actions, status and statistics obtained and reported by an agent may be used by DOE 830 to determine a deployment context and associated resource configuration information, and orchestration actions.

Figure 9:
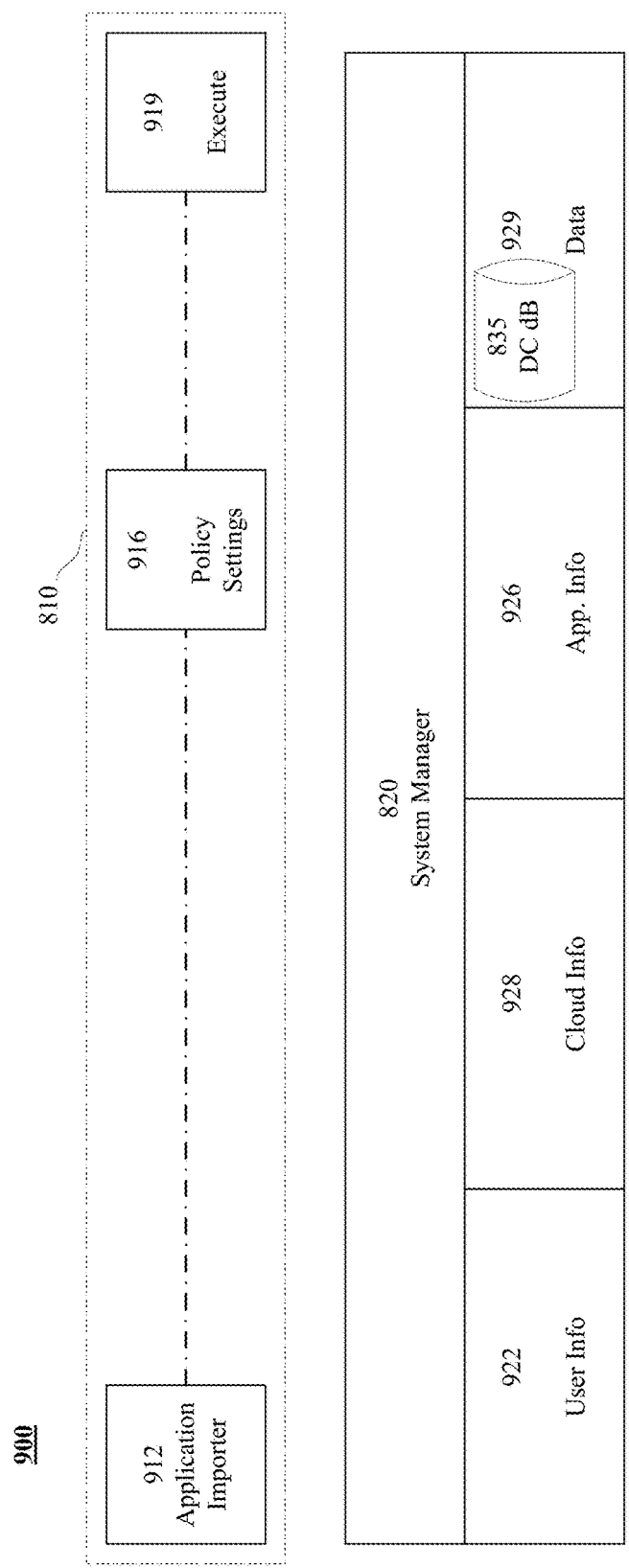
FIG. 9 shows the architecture 900 of exemplary system manager 820 along with other modules and/or layers that interact with System Manager 820.

FIG. 9 shows the architecture 900 of exemplary system manager 820 along with other modules and/or layers that interact with System Manager 820. In some embodiments, System Manager 820 may interact with exemplary User Interface Layer 910, which, in turn, may facilitate user configuration of system 900. Exemplary User Interface Layer 910 may comprise Application Importer Module 912, Policy Setting Module 916, and Execute Module 919.

For example, Application Importer Module 912 may be used to import an application, specify deployment contexts (e.g. based on methods 600, 660 and/or 670) and/or to create a cloud agnostic representation 890 of a multi-tier application and perform other tasks. In addition, as indicated by the dashed lines, the deployment contexts may be stored in DC database 835. In some embodiments, deployment context information in DC database 835 may be displayed in a catalog form, so that users may build new deployment contexts easily based on pre-existing stored deployment contexts in DC database 835.

Exemplary Application Importer Module 912 may facilitate the importation of new applications and/or associated deployment contexts, the migration of applications, services, and/or images in system 800. In some embodiments, imported applications may be displayed to users using a "desktop-style" view, where icons representing the various applications are shown to the user in a window or browser tab. In some embodiments, pre-published applications or service in a marketplace associated with system 800 (for example, applications in an application library or "app store" associated with or supported by system 800 may be imported by users directly onto their desktop view. In some embodiments, Application Importer Module 912 may allow users to license or buy one or more of pre-published applications or services (e.g. a database service). In general, any software application may be imported using exemplary Application Importer Module 912 in User Interface Layer 910.

Exemplary User Interface Layer 910 may also include various end-user modules that facilitate user customization and configuration of system 400. In some embodiments, Policy Settings Module 916 may provide appropriate graphical user interfaces and other features to facilitate users to set, modify, and/or delete policies, including rules for deployment contexts. For example, users may set policies that limit the clouds and/or configurations that specific user(s) and/or application(s) may use, limit the monetary budget available for an application run or a series of runs, etc. The time limits, cost limits and/or other information may be associated with a resource, form part of a deployment context, which may be stored in DC database 835 and indexed by a corresponding DCI.

In some embodiments, Execute Module 918 may provide user interfaces to facilitate users to select a cloud agnostic representation of a multi-tier application and/or a cloud 872-*i* (from available clouds 872-1, 872-2 . . . 872-N), for execution of the multi-tier application. In some embodiments, the multi-tier application may then be launched based on the deployment context. In some embodiments, upon initiation of execution, a deployment context may be determined by System Manager 820 and/or Orchestrator/DOE 830, and one or more resources may be configured based on configuration settings determined from the deployment context.

In addition System Manager 820 may also be used to manage automated tasks, which, in some embodiments, may have been initiated by DOE/Orchestrator 830. System Manager 820 may also call or invoke functions implemented by DOE/Orchestrator 830 in order to perform various system related activities. For example, System Manager 820 may invoke and/or configure a secure communications module to facilitate secure communication with a new VM on a cloud 872-*i* based on configuration settings determined for a current deployment context. In some embodiments, As another example, service specific network ingress/egress rules specified as part of service configuration metadata for a service may be associated with a deployment context of a cloud based multi-tier application. The service specific network ingress/egress rules may be used to facilitate network configuration for the service by DOE/Orchestrator 830.

For example, service configuration metadata associated with a service level deployment context for a MySQL service resource in an exemplary multi-tier application, may specify an Incoming Port for the MySQL service resource as Port 3306. Further, the ingress/egress rules may specify that components (e.g. services) in tiers that are directly connected to the MySQL service resource may communicate with the MySQL service. The ingress/egress rules for the exemplary MySQL service may further specify that components (e.g. services) in tiers that are not directly connected to the MySQL service may not communicate with the MySQL service. Accordingly, when the MySQL service is deployed on a VM, DOE/Orchestrator 830 may configure the MySQL service in accordance with the ingress/egress service level rules specified for the deployment context.

Accordingly, in some embodiments, DOE/Orchestrator 830 may use service specific network ingress/egress rules (as embodied in cloud agnostic representation 890 of a multi-tier application) to launch events (e.g. scripts) specifying network security policies for the cloud 872-*i* (on which the multi-tier application is being deployed) that will allow components in tiers directly connected to the MySQL service to connect to port 3306 on the node running the service. Further, services in tiers that are not directly connected to the MySQL service may be prevented from accessing port 3306 on node running the MySQL service.

Figure 10:
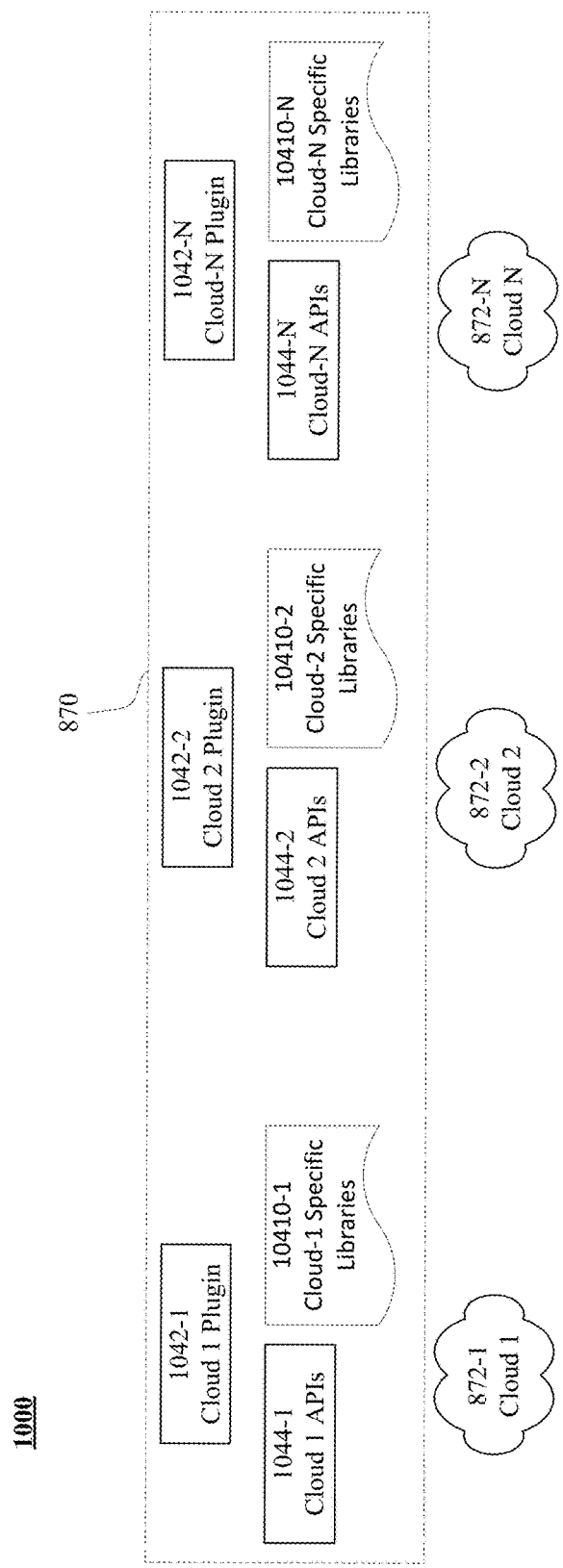
FIG. 10 shows an exemplary architecture 1000 of Application Deployment Layer.

FIG. 10 shows an exemplary architecture 1000 of Application Deployment Layer 1070. In some implementations, the deployment and running of applications and the dynamic management of clusters and other cloud resources may be facilitated by cloud Application Deployment Layer 1070. Cloud Application Deployment Layer 1070 may include Cloud Plugins 1042, Cloud APIs 1044 and Cloud Specific Libraries 1046.

In some embodiments, the dynamic management of cloud resources may be facilitated by using a service such as a node management service running on gateway 880-*i* for a specific cloud 872-*i*. Gateway 880-*i* may also maintain Cloud APIs 1044, such as Cloud-1 APIs 1044-1, Cloud-2 APIs 1044-2 . . . Cloud N APIs 1044-N. In addition, gateway 880-*i* may also maintain Cloud specific Libraries 1046, such as Cloud 1 Specific Libraries 1046-1, Cloud 2 Specific Libraries 1046-2, Cloud N Specific Libraries 1046-N, etc. The node management service may act as an intermediate layer between the cloud provider 872-*i* and DOE/Orchestrator 830 and facilitate the addition or removal of nodes.

Cloud Specific Libraries 1046 and Cloud APIs 1044 may comprise a library of implementations for primitives and composite interfaces, respectively, for a specific cloud 872-*i*. In some embodiments, Cloud APIs 1044 and Cloud Specific Libraries 1046 may be invoked using Cloud Plugins 1042. For example, Cloud Plugins 1042 may be used to invoke appropriate Cloud APIs 1044 and routines from Cloud Specific Libraries 1046 that facilitate the deployment and running of multi-tier applications on Clouds 872, where the multi-tier applications may have been described using cloud agnostic application descriptors and standardized primitives and using functionality provided by Cloud Standardization Layer 860.

Referring to FIG. 8, in some embodiments, when a VM is to be deployed on a cloud 872, gateway 880 may use Cloud APIs 1044 and Cloud Specific Libraries 1046 library to perform deployment and execution tasks for that cloud 872. For example, shared storage primitives on Cloud Standardization Layer 860 may lead to instantiation of a DFS shared storage implementation on an Amazon™ cloud, while instantiating the shared storage implementation on a SoftLayer™ cloud will set up NAS/SAN. In some embodiments, gateway 880 may also launch one or more agents, which can be deployed on nodes on Clouds 872, to monitor and report task status back to gateway 880 and/or to perform other functions.

In some embodiments, functionality specified or configured by the user in User Interface Layer 810 may be implemented by one or more modules in cloud Application Deployment Layer 870, which, in some implementations, may include software agents running on a server and/or on the various clouds. These software agents may perform specific actions, facilitate determination of deployment contexts, monitor application runtime statistics, collect cloud related information such as but not limited to cloud load information, pricing information, security information etc., and/or collect information related to VM and/or user actions.

Figure 11:
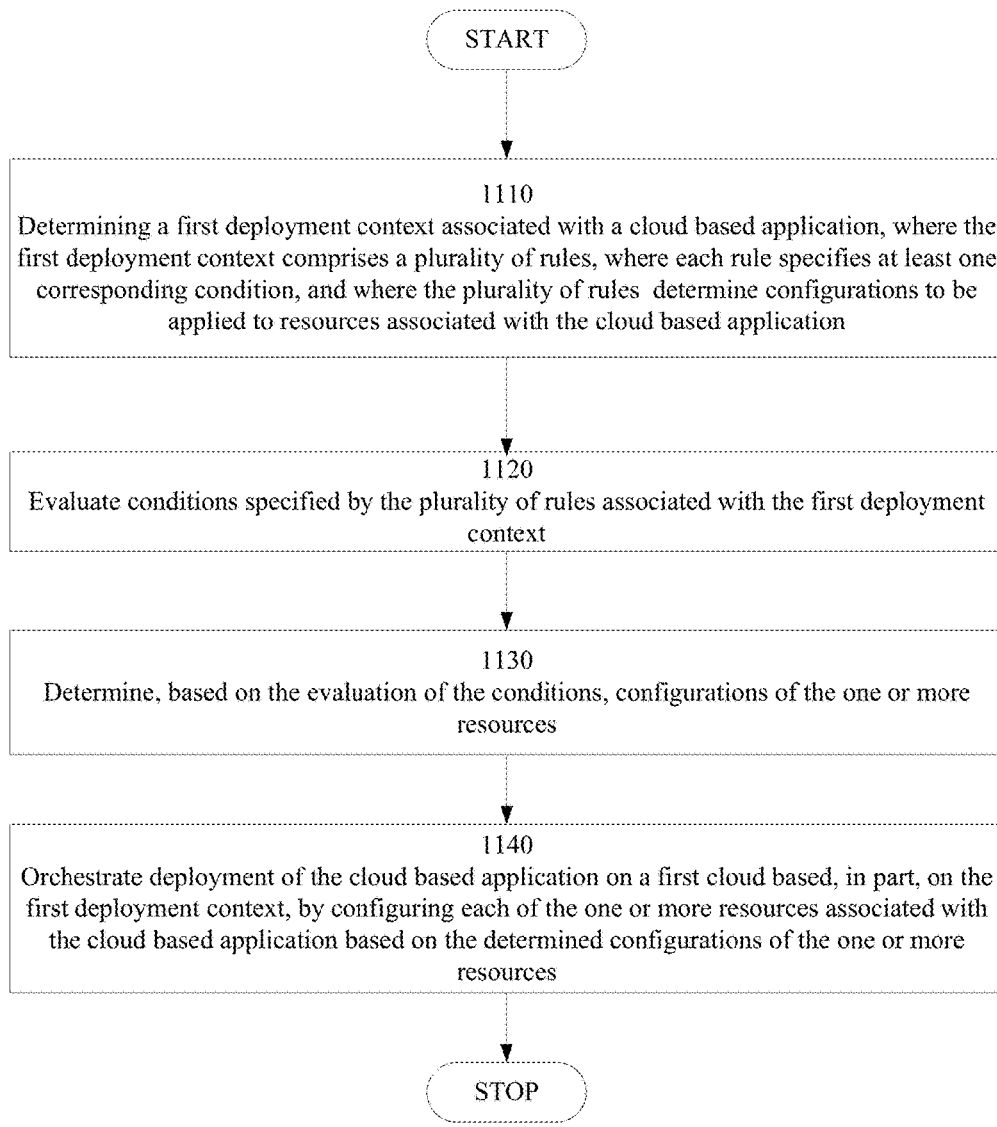
FIG. 11 shows an exemplary method 1100 of orchestrating a cloud based application based on a deployment context in a manner consistent with disclosed embodiments.

FIG. 11 shows an exemplary method 1100 of orchestrating a cloud based application based on a deployment context in a manner consistent with disclosed embodiments. In some embodiments, to orchestrate and deploy a cloud based application on first cloud (e.g. cloud 872-1) in block 1110, a first deployment context associated with the cloud based application may be determined. For example, the first deployment context may comprise a plurality of rules, where each rule in the plurality of rules specifies at least one corresponding condition, and where the plurality of rules determine configurations to be applied to one or more resources associated with the cloud based application. In some embodiments, the first deployment context may be determined dynamically based, in part, on information received from one or more cloud agents running on one or more clouds (e.g. clouds 872-1, 872-2 etc), where the one or more clouds include the first cloud (e.g. 872-1). In some embodiments, the first deployment context may be autonomously determined based on one or more of: a user account and/or a user group associated with a user invoking the cloud based application; or a geographical location associated with a user invoking the cloud based application.

In some embodiments, in block 1120, conditions specified by the plurality of rules associated with the first deployment context may be evaluated. In some embodiments, the conditions specified by the plurality of rules associated with the first deployment context may be evaluated by performing at least one of: evaluating a first subset of the conditions based, in part, on information received from one or more cloud agents running on one or more cloud infrastructures (e.g. 872-1, 872-2, etc); and/or evaluating a second subset of the conditions using cloud plugins for the one or more cloud infrastructures (e.g. 872-1, 872-2, etc).

Further, in block 1130, based on the evaluation of the conditions, configurations of the one or more resources may be determined. Next, in block 1140, deployment of the cloud based application on a first cloud may be orchestrated based, in part, on the first deployment context, by configuring each of the one or more resources associated with the cloud based application based on the determined configurations of the one or more resources.

In some embodiments, the method may further comprise orchestrating the deployment of the cloud based application on a second cloud (e.g. 872-2) based, in part, on a second deployment context by configuring each of the one or more resources associated with the cloud based application based on the second deployment context, wherein the second deployment context is different from the first deployment context. In some embodiments, the orchestration of the cloud based application on the first cloud (e.g. 872-1) based on the first deployment context and orchestration of the cloud based application on the second cloud (e.g. 872-2) based on the second deployment context may performed concurrently or in parallel. In some embodiments, the first cloud (e.g. 872-1) and the second cloud (e.g. 872-2) may form a heterogeneous cloud computing environment, wherein the first cloud (e.g. 872-1) is of a first cloud type and the second cloud (e.g. 872-2) is of a second cloud type, different from the first cloud type. For example, cloud 872-1 may be an Amazon EC2 cloud, while cloud 872-2 may be a VMWare vCloud. In some embodiments, orchestrating of the deployment of the cloud based application on the first cloud (e.g. 872-1) and orchestrating of the deployment of the cloud based application on the second cloud (e.g. 872-2) may both be based on a cloud agnostic representation (e.g. cloud agnostic representation 890) of the cloud based application.

In some embodiments, the method above may be performed autonomously and without user-intervention. In some embodiments, the method may further comprise deploying the cloud based application on the first cloud.

In some embodiments, the methods and modules described herein may be implemented using a variety of wired and/or wirelessly networked processors, various computers, and computing devices, including mobile devices such as smartphones, notebooks, and handheld computers, and various distributed computing systems including clouds. In some embodiments, the method and modules described herein may be embodied in computer-readable media, including magnetic and/or optical media and various types of non-volatile memory and/or media.

Other embodiments will be apparent to those skilled in the art from consideration of the specification and practice of one or more embodiments of the disclosed herein. It is intended that the specification and examples be considered as exemplary only, with a true scope and spirit of the invention being indicated by the following claims.

What is claimed is:

1. A method comprising:
at a server including one or more processors and a non-transitory memory:
determining a first deployment context associated with a cloud based application, the first deployment context comprising a plurality of rules, wherein each rule in the plurality of rules specifies at least one corresponding condition, wherein the plurality of rules determine configurations to be applied to one or more resources associated with the cloud based application;
evaluating conditions specified by the plurality of rules associated with the first deployment context, wherein evaluating the conditions includes evaluating environmental parameters of a plurality of clouds at a deployment time of the cloud based application;
determining, based on the evaluation of the conditions, configurations of the one or more resources, wherein determining the configurations of the one or more resources includes determining a first cloud for deployment of the cloud based application based, at least in part, on parameters of the first cloud satisfying the conditions at the deployment time of the cloud based application; and
orchestrating deployment of the cloud based application on the first cloud based, in part, on the first deployment context, by configuring each of the one or more resources associated with the cloud based application based on the determined configurations of the one or more resources.

2. The processor-implemented method of claim 1, wherein determining the first deployment context comprises:
determining the first deployment context dynamically based, in part, on information received from one or more cloud agents running on one or more clouds, the one or more clouds comprising the first cloud.

3. The processor-implemented method of claim 1, wherein evaluating the conditions specified by the plurality of rules associated with the first deployment context comprises at least one of:
evaluating a first subset of the conditions based, in part, on information received from one or more cloud agents running on one or more cloud infrastructures; or
evaluating a second subset of the conditions using cloud plugins for the one or more cloud infrastructures.

4. The processor-implemented method of claim 1, further comprising:
orchestrating the deployment of the cloud based application on a second cloud based, in part, on a second deployment context by configuring each of the one or more resources associated with the cloud based application based on the second deployment context, wherein the second deployment context is different from the first deployment context.

5. The processor-implemented method of claim 4, wherein the orchestration of the first deployment context and the second deployment context are performed concurrently.

6. The processor-implemented method of claim 4, wherein:
the first cloud and the second cloud form a heterogeneous cloud computing environment, wherein the first cloud is of a first cloud type and the second cloud is of a second cloud type, different from the first cloud type, and
orchestrating of the deployment of the cloud based application on the first cloud and orchestrating of the deployment of the cloud based application on the second cloud are both based on a cloud agnostic representation of the cloud based application.

7. The processor-implemented method of claim 1, wherein the method is performed autonomously and without user-intervention.

8. The processor-implemented method of claim 1, further comprising:
deploying the cloud based application on the first cloud.

9. The processor-implemented method of claim 1, wherein the first deployment context is autonomously determined based on one or more of:
a user group associated with a user invoking the cloud based application; or
a geographical location associated with a user invoking the cloud based application.

10. The method of claim 1, wherein the first deployment context is specified by associating at least two deployment contexts from different hierarchical levels of application level deployment contexts.

11. An apparatus comprising:
a memory, and
at least one processor coupled to the memory, wherein the processor is configured to:
determine a first deployment context associated with a cloud based application, the first deployment context comprising a plurality of rules, wherein each rule in the plurality of rules specifies at least one corresponding condition, wherein the plurality of rules determine configurations to be applied to one or more resources associated with the cloud based application;
evaluate conditions specified by the plurality of rules associated with the first deployment context, wherein evaluating the conditions includes evaluating environmental parameters of a plurality of clouds at a deployment time of the cloud based application;
determine, based on the evaluation of the conditions, configurations of the one or more resources, wherein determining the configurations of the one or more resources includes determining a first cloud for deployment of the cloud based application based, at least in part, on parameters of the first cloud satisfying the conditions at the deployment time of the cloud based application; and
orchestrate deployment of the cloud based application on a first cloud based, in part, on the first deployment context, by configuring each of the one or more resources associated with the cloud based application based on the determined configurations of the one or more resources.

12. The apparatus of claim 11, wherein to determine the first deployment context, the at least one processor is configured to:
determine the first deployment context dynamically based, in part, on information received from one or more cloud agents running on one or more clouds, the one or more clouds comprising the first cloud.

13. The apparatus of claim 11, wherein to evaluate the conditions specified by the plurality of rules associated with the first deployment context, the at least one processor is configured to perform at least one of:
- evaluate a first subset of the conditions based, in part, on information received from one or more cloud agents running on one or more cloud infrastructures; or
- evaluate a second subset of the conditions using cloud plugins for the one or more cloud infrastructures.

14. The apparatus of claim 11, wherein the at least one processor is further configured to:
- orchestrate the deployment of the cloud based application on a second cloud based, in part, on a second deployment context by configuring each of the one or more resources associated with the cloud based application based on the second deployment context, wherein the second deployment context is different from the first deployment context.

15. The apparatus of claim 14, wherein the at least one processor is configured to:
- orchestrate the first deployment context and orchestrate the second deployment context concurrently.

16. The apparatus of claim 14, wherein the first cloud and the second cloud form a heterogeneous cloud computing environment, wherein the first cloud is of a first cloud type and the second cloud is of a second cloud type, different from the first cloud type, and wherein the at least one processor is configured to
- orchestrate of the deployment of the cloud based application on the first cloud and orchestrate of the deployment of the cloud based application on the second cloud based on a cloud agnostic representation of the cloud based application.

17. The apparatus of claim 11, wherein the processor is further configured to:
- deploy the cloud based application on the first cloud.

18. The apparatus of claim 11, wherein the processor is configured to autonomous determine the first deployment context based on one or more of:
- a user group associated with a user invoking the cloud based application; or
- a geographical location associated with a user invoking the cloud based application.

19. The apparatus of claim 11, wherein the first deployment context is specified by associating at least two deployment contexts from different hierarchical levels of application level deployment contexts.

20. A non-transitory computer-readable medium comprising instructions, which when executed by a processor, perform a method comprising:
- determining a first deployment context associated with a cloud based application, the first deployment context comprising a plurality of rules, wherein each rule in the plurality of rules specifies at least one corresponding condition, wherein the plurality of rules determine configurations to be applied to one or more resources associated with the cloud based application;
- evaluating conditions specified by the plurality of rules associated with the first deployment context, wherein evaluating the conditions includes evaluating environmental parameters of a plurality of clouds at a deployment time of the cloud based application;
- determining, based on the evaluation of the conditions, configurations of the one or more resources, wherein determining the configurations of the one or more resources includes determining a first cloud for deployment of the cloud based application based, at least in part, on parameters of the first cloud satisfying the conditions at the deployment time of the cloud based application; and
- orchestrating deployment of the cloud based application on a first cloud based, in part, on the first deployment context, by configuring each of the one or more resources associated with the cloud based application based on the determined configurations of the one or more resources.

21. The computer-readable medium of claim 20, wherein determining the first deployment context comprises:
- determining the first deployment context dynamically based, in part, on information received from one or more cloud agents running on one or more clouds, the one or more clouds comprising the first cloud.

22. The computer-readable medium of claim 20, wherein evaluating the conditions specified by the plurality of rules associated with the first deployment context comprises at least one of:
- evaluating a first subset of the conditions based, in part, on information received from one or more cloud agents running on one or more cloud infrastructures; or
- evaluating a second subset of the conditions using cloud plugins for the one or more cloud infrastructures.

23. The computer-readable medium of claim 20, further comprising:
- orchestrating the deployment of the cloud based application on a second cloud based, in part, on a second deployment context by configuring each of the one or more resources associated with the cloud based application based on the second deployment context, wherein the second deployment context is different from the first deployment context.

24. The computer-readable medium of claim 23, wherein the orchestration of the first deployment context and the second deployment context are performed concurrently.

25. The computer-readable medium of claim 23, wherein:
- the first cloud and the second cloud form a heterogeneous cloud computing environment, wherein the first cloud is of a first cloud type and the second cloud is of a second cloud type, different from the first cloud type, and
- orchestrating of the deployment of the cloud based application on the first cloud and orchestrating of the deployment of the cloud based application on the second cloud are both based on a cloud agnostic representation of the cloud based application.

26. The computer-readable medium of claim 20, wherein the first deployment context is autonomously determined based on one or more of:
- a user group associated with a user invoking the cloud based application; or
- a geographical location associated with a user invoking the cloud based application.

27. The computer-readable medium of claim 20, wherein the first deployment context is specified by associating at least two deployment contexts from different hierarchical levels of application level deployment contexts.

* * * * *